US011221268B2

(12) United States Patent
Madison et al.

(10) Patent No.: US 11,221,268 B2
(45) Date of Patent: Jan. 11, 2022

(54) QUANTUM PRESSURE STANDARD AND METHODS FOR DETERMINING AND USING SAME

(71) Applicants: The University of British Columbia, Vancouver (CA); British Columbia Institute of Technology, Burnaby (CA)

(72) Inventors: Kirk W. Madison, Vancouver (CA); James Lawrence Booth, Burnaby (CA); Pinrui Shen, Vancouver (CA); Roman V. Krems, Vancouver (CA)

(73) Assignees: The University of British Coumbia, Vancouver (CA); British Columbia Institute of Technology, Burnaby (CA)

( * ) Notice: Subject to any disclaimer, the term of this patent is extended or adjusted under 35 U.S.C. 154(b) by 203 days.

(21) Appl. No.: 16/520,328

(22) Filed: Jul. 23, 2019

(65) Prior Publication Data

US 2020/0025639 A1    Jan. 23, 2020

Related U.S. Application Data

(60) Provisional application No. 62/702,120, filed on Jul. 23, 2018.

(51) Int. Cl.
*G01L 21/30* (2006.01)
*H01J 49/00* (2006.01)
(Continued)

(52) U.S. Cl.
CPC ............ *G01L 21/30* (2013.01); *G01L 27/002* (2013.01); *G21K 1/006* (2013.01); *H01J 49/0009* (2013.01); *H05H 3/02* (2013.01)

(58) Field of Classification Search
CPC ........ G01L 21/30; G01L 27/002; H01J 41/10; H01J 49/0009; G12K 1/006; H05H 3/02
See application file for complete search history.

(56) References Cited

U.S. PATENT DOCUMENTS 5,274,231 A   12/1993  Chu et al.
7,915,577 B2   3/2011  Fatemi et al.
(Continued)

OTHER PUBLICATIONS

K. Jooya, N. Musterer, K. W. Madison, J. L. Booth, Photon-scattering-rate measurement of atoms in a magneto-optical trap, Phys. Rev. A 88, 063401 (2013).
(Continued)

*Primary Examiner* — Wyatt A Stoffa
(74) *Attorney, Agent, or Firm* — Todd A. Rattray; Oyen Wiggs Green & Mutala LLP

(57) ABSTRACT

A method determines a total velocity average cross-section parameter $\langle \sigma_{tot} v \rangle$ in a relationship of the form $\Gamma_{loss}(U) = n_b \langle \sigma_{tot} v \rangle \cdot f(U, U_d)$, where: $\Gamma_{loss}(U)$ is a rate of exponential loss of sensor atoms from a cold atom sensor trap of trap depth potential energy U in a vacuum environment due to collisions with residual particles in the vacuum environment; $n_b$ is a number density of residual particles in the vacuum environment; $U_d$ is a parameter given by $$U_d = \sqrt{2 k_B T / m_{bg}} \, \frac{4\pi \hbar^2}{m_t \langle \sigma_{tot} v \rangle}$$

which relates the masses of the sensor atoms $m_t$ and residual particles $m_{bg}$ to the total velocity average cross-section parameter $\langle \sigma_{tot} v \rangle$; and $f(U, U_d)$ is a function of the trap depth potential energy U and the parameter $U_d$ which models a naturally occurring dependence of the loss rate $\Gamma_{loss}(U)$ on the trap depth potential energy U and the parameter $U_d$, where $f(U=0, U_d)$ is unity for all $U_d$.

23 Claims, 10 Drawing Sheets

(51) Int. Cl.
  *G01L 27/00*   (2006.01)
  *H05H 3/02*    (2006.01)
  *G21K 1/00*    (2006.01)

(56) References Cited

U.S. PATENT DOCUMENTS

| | | | | |
|---|---|---|---|---|
| 8,803,072 | B2* | 8/2014 | Booth | G01L 21/00 |
| | | | | 250/251 |
| 2011/0290991 | A1* | 12/2011 | Booth | G21K 1/006 |
| | | | | 250/251 |
| 2019/0348251 | A1* | 11/2019 | Monroe | H01J 37/18 |
| 2020/0046858 | A1* | 2/2020 | Freeman | A61K 49/106 |

OTHER PUBLICATIONS

T. Arpornthip, C. A. Sackett, K. J. Hughes, Vacuum-pressure measurement using a magneto-optical trap, Phys. Rev. A 85, 033420 (2012).
J. Scherschligt, et al., Development of a new UHV/XHV pressure standard (cold atom vacuum standard), Metrologia 54, S125 (2017).
A. Lambrecht, J. Schmidt, P. Weckesser, M. Debatin, L. Karpa, and T. Schaetz, Long lifetimes and effective isolation of ions in optical and electrostatic traps, Nature Photonics 11, 704 (2017).
T. Schaetz, Trapping ions and atoms optically, J. Phys. B: At. Mol. Opt. Phys. 50, 102001 (2017).

\* cited by examiner

QUANTUM PRESSURE STANDARD AND METHODS FOR DETERMINING AND USING SAME

REFERENCE TO RELATED APPLICATIONS

This application claims the benefit under 35 U.S.C. § 119 of application No. 62/702,120 filed 23 Jul. 2018, and entitled QUANTUM PRESSURE STANDARD which is hereby incorporated herein by reference for all purposes.

TECHNICAL FIELD

The technology described herein relates to measuring the pressure of residual particles in low pressure (vacuum) environments. Particular embodiments provide methods for determining and using universal quantum pressure standards for determining the pressure of residual particles in low pressure (vacuum) environments.

BACKGROUND

Vacuum processing of materials has enabled the fabrication of many modern semiconductor devices, driving the computer and communication revolutions now being enjoyed throughout society. One problem that has persisted with vacuum processing is the lack of a primary pressure definition for very low vacuum pressures. National standards agencies across the globe can calibrate commonly used pressure gauges such as ionization gauges, but use of these ionization gauges involves comparison against secondary standards and, in general, only Nitrogen and Argon calibration services are offered. There is a general desire for a convenient, primary standard that is capable of measuring the partial pressure of any type of gas (atomic or molecular) in a vacuum environment. Such a primary standard would be a boon to both metrology and to advanced material processing technologies, for example.

Cold atom technology involves the laser cooling and trapping of atoms. It is known that collisions between so-called cold atoms trapped in such traps and residual particles in a vacuum environment can cause the trapped atoms to escape the trap. U.S. Pat. No. 8,803,072 (referred to hereinafter as the '072 Patent), which is hereby incorporated herein by reference describes magnetic traps (MTs) and magneto-optic traps (MOTs) which trap and cool sensor atoms and methods for using these trapped sensor atoms for estimating the pressure of residual atoms in vacuum environments. The '072 Patent also describes how pure optical or pure magnetic traps can be used after the initial laser cooling. Such cold atom traps are described, for example, in "Cooling Neutral Atoms in a Magnetic Trap for Precision Spectroscopy", Pritchard, David E. Phys. Rev. Lett., 1983 and in the '072 Patent. There are a wide variety of such cold atom traps known in the art. For brevity, such cold atom traps may be referred to herein as cold atom traps, magneto-optical traps (MOTs), magnetic traps (MTs) or simply as traps.

The techniques described by the '072 Patent for determining the pressure of residual particles are based on determining the number density ($n_b$) of the residual particles measured in units of inverse volume, which is related to the pressure (p) of the residual particles by the ideal gas law $p=nk_BT$, where $k_B$ is Boltzmann's constant and T is the temperature. The "cold" atoms trapped in the trap may be knocked out of the trap when struck by residual particles in the vacuum. On average, the number of trapped sensor atoms will decrease according to $N(t)=Ae^{-\Gamma t}$ where A is the initial number of cold atoms in the trap, gamma, $\Gamma$, is the decay rate, and t is the elapsed time after the laser source was extinguished and the sensor particles were transferred into the trap. According to the '072 Patent, the average decay rate $\Gamma$ is proportional to the number density $n_b$ of the residual particles in the vacuum environment (i.e. $\Gamma=kn_b$). Consequently, the number density (or equivalently, the pressure), $n_b$, of the residual particles can be determined from a measurement of the decay rate $\Gamma$ and a knowledge of the proportionality constant k. For a single component gas, the gas density is given by $$n_b = \frac{\Gamma}{k}.$$

The parameter k described in the '072 Patent is known as the velocity averaged cross-section $\langle \sigma \cdot v \rangle$ where a is a collision cross-section parameter of the two species (i.e. the trapped sensor atoms and the residual particles), v is the relative velocity of the residual particles relative to the trapped sensor atoms and the angle brackets indicate that the product of the cross-section and the relative velocity is averaged over the Maxwell-Boltzmann velocity distribution of the residual particles. The '072 Patent also describes how the parameter k (or the velocity averaged cross-section $\langle \sigma \cdot v \rangle$) varies with trap depth (U). The '072 Patent suggests that the parameter k may be determined by known immutable interaction potentials between the two species in question (the trapped sensor atoms and the residual particles) and the thermal distribution of the residual particles. Since publication of the '072 Patent, its pressure measurement techniques have been criticized based on the view that the inaccuracy of ab initio calculations of the interaction potentials used to determine how the parameter k (or the velocity averaged cross-section $\langle \sigma \cdot v \rangle$ varies with trap depth introduce uncertainty into the parameter k and the corresponding calculation of the number density of the residual particle number density according to $$n_b = \frac{\Gamma}{k}.$$

Consequently, there remains a general desire to determine the number density (or pressure) of residual particles in a vacuum environment.

Based on the above-described criticism of the techniques described in the '072 Patent, there is a general desire to determine the velocity averaged cross-section $\langle \sigma \cdot v \rangle$ for pair of species (a trapped atom and a residual particle) at any trap depth (U) without having to rely on a priori knowledge of the interatomic potentials between the species pair.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for determining a total velocity average cross-section parameter $\langle Y_{tot}v \rangle$ in a relationship of the form $\Gamma_{loss}(U) = n_b \langle_{tot}v \rangle \cdot f(U, U_d)$, where: $\Gamma_{loss}(U)$ is a rate of exponential loss of sensor atoms from a cold atom sensor trap of trap depth potential energy U in a vacuum environment due to collisions with residual particles in the vacuum environment; $n_b$ is a number density of residual particles in the vacuum environment; $U_a$ is a parameter given by $$U_d = \sqrt{2k_B T / m_{bg}} \frac{4\pi \hbar^2}{m_t \langle \sigma_{tot} v \rangle}$$

which relates the masses of the sensor atoms $m_t$ and residual particles $m_{bg}$ to the total velocity average cross-section parameter $\langle \sigma_{tot} v \rangle$; and $f(U, U_d)$ is a function of the trap depth potential energy U and the parameter $U_d$ which models a naturally occurring dependence of the loss rate $\Gamma_{loss}(U)$ on the trap depth potential energy U and the parameter $U_d$, where $f(U=0, U_d)$ is unity for all $U_d$.

The method comprises: for a particular species pair comprising the sensor atoms and the residual particles, iterating a process which comprises in each iteration: varying the trap depth potential energy U for the cold atom sensor trap in which the sensor atoms are trapped; and measuring the loss rate $\Gamma_{loss}(U)$ of the sensor atoms from the cold atom sensor trap; after a plurality of iterations of the process, extrapolating the measured loss rate $\Gamma_{loss}(U)$ data to obtain an estimate of $\Gamma_{loss}(U=0)$; and determining the total velocity average cross-section parameter $\langle \sigma_{tot} v \rangle$ wherein determining the total velocity average cross-section parameter $\langle \sigma_{tot} v \rangle$ comprises performing a curve fitting process to fit $$\frac{\Gamma_{loss}(U)}{\Gamma_{loss}(U=0)} = \frac{\langle \sigma_{loss} v \rangle}{\langle \sigma_{tot} v \rangle} = f(U, U_d)$$

to solve for the total velocity average cross-section parameter $\langle \sigma_{tot} v \rangle$.

Performing the curve fitting process to fit $$\frac{\Gamma_{loss}(U)}{\Gamma_{loss}(U=0)} = \frac{\langle \sigma_{loss} v \rangle}{\langle \sigma_{tot} v \rangle} = f(U, U_d)$$

to solve for the total velocity average cross-section parameter $\langle \sigma_{tot} v \rangle$ may comprise: expressing $f(U, U_d)$ as $f(U, \langle \sigma_{tot} v \rangle)$ based on $$U_d = \sqrt{2k_B T / m_{bg}} \frac{4\pi \hbar^2}{m_t \langle \sigma_{tot} v \rangle};$$

and; and performing the curve fitting process to solve directly for the total velocity average cross-section parameter $\langle \sigma_{tot} v \rangle$.

Performing the curve fitting process to fit $$\frac{\Gamma_{loss}(U)}{\Gamma_{loss}(U=0)} = \frac{\langle \sigma_{loss} v \rangle}{\langle \sigma_{tot} v \rangle} = f(U, U_d)$$

to solve for the total velocity average cross-section parameter $\langle \sigma_{tot} v \rangle$ may comprise: performing the curve fitting process to fit $$\frac{\Gamma_{loss}(U)}{\Gamma_{loss}(U=0)} = \frac{\langle \sigma_{loss} v \rangle}{\langle \sigma_{tot} v \rangle} = f(U, U_d)$$

to thereby determine the parameter $U_d$; and determining the total velocity average cross-section parameter $\langle \sigma_{tot} v \rangle$ according to $$\langle \sigma_{tot} v \rangle = \sqrt{2k_B T / m_{bg}} \frac{4\pi \hbar}{m_t U_d}.$$

The model function $f(U, U_d)$ may have a form of a polynomial expansion in a variable $$\left( \frac{U}{U_d} \right).$$

The model function $f(U, U_d)$ may have a form of $(1-p_{QM})$, where $$p_{QM} = \sum_{j=1}^{J} \beta_j \left( \frac{U}{U_d} \right)^j$$

where J is an integer greater than 1 and $\beta_j$ are parameters of the model function $f(U, U_d)$. The parameter $p_{QM}$ of the model function $f(U, U_d)$ may represent a probability that a sensor atom stays in the cold atom sensor trap after a collision with a residual particle. The parameters $\beta_j$ of the model function $f(U, U_d)$ may be determined based on a theoretical model of collisions between the sensor atoms and the residual particles. The parameters $\beta_j$ of the model function $f(U, U_d)$ may be experimentally determined.

Once the total velocity average cross-section parameter, $\langle \sigma_{tot} v \rangle$ is determined in accordance with the method described above, another aspect of the invention provides a method for determining a number density $n_b$ of second residual particles in a second vacuum environment comprising second sensor atoms trapped in a second cold atom sensor trap of trap depth potential energy U*. The method comprises: using the total velocity average cross-section parameter $\langle \sigma_{tot} v \rangle$ determined in accordance with the method described above wherein the second sensor atoms are the same as the sensor atoms and the second residual particles are the same as the residual particles; measuring a loss rate $\Gamma_{loss}(U=U^*)$ of second sensor atoms from the second cold atom sensor trap at the trap depth potential energy U*; and determining the number density $n_b$ of second residual particles in the second vacuum environment according to $n_b = \Gamma_{loss}(U^*)/[\langle \sigma_{tot} v \rangle \cdot f(U=U^*, U_d)]$.

The second vacuum environment may be the same as or different from the vacuum environment and the second cold atom trap may be the same as or different from the cold atom trap.

The model function $f(U, U_d)$ may have a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

Once the total velocity average cross-section parameter $\langle \sigma_{tot} v \rangle$ is determined in accordance with the method described above, another aspect of the invention provides a method for calibrating an ionization gauge which measures a pressure $P_b$ of second residual particles in a second vacuum environment comprising second sensor atoms trapped in a second cold atom sensor trap of trap depth potential energy $U^*$. The method comprises: using the total velocity average cross-section parameter $\langle \sigma_{tot} v \rangle$ determined in accordance with the method described above, wherein the second sensor atoms are the same as the sensor atoms and the second residual particles are the same as the residual particles; measuring a loss rate $\Gamma_{loss}(U=U^*)$ of second sensor atoms from the second cold atom sensor trap at the trap depth potential energy $U^*$; measuring the pressure $P_b$ of the second residual particles in the second vacuum environment using the ionization gauge at the same trap depth potential energy $U^*$; and determining a calibration factor $i_g$ for the ionization gauge according to:

$$i_g = \frac{P_d \langle \sigma_{tot} v \rangle}{(k_B T)\Gamma_{loss}(U)} f(U = U^*, U_d).$$

The second vacuum environment may be the same as or different from the vacuum environment and the second cold atom trap may be the same as or different from the cold atom trap.

The model function $f(U, U_d)$ may have a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

Once the number density $n_b$ of second residual particles in the second vacuum environment determined in accordance with the method described above, another aspect of the invention provides a method for calibrating an ionization gauge which measures a pressure $P_b$ of second residual particles in a second vacuum environment comprising second sensor atoms trapped in a second cold atom sensor trap of trap depth potential energy $U^*$. The method comprises: using the number density $n_b$ of second residual particles in the second vacuum environment determined in accordance with the method described above, wherein the second sensor atoms are the same as the sensor atoms and the second residual particles are the same as the residual particles; measuring a loss rate $\Gamma_{loss}(U=U^*)$ of second sensor atoms from the second cold atom sensor trap at the trap depth potential energy $U^*$; measuring the pressure $P_b$ of the second residual particles in the second vacuum environment using the ionization gauge at the same trap depth potential energy $U^*$; and determining a calibration factor $i_g$ for the ionization gauge according to:

$$i_g = \frac{P_b}{n_b(k_B T)}.$$

The second vacuum environment may be the same as or different from the vacuum environment and the second cold atom trap may be the same as or different from the cold atom trap.

The model function $f(U, U_d)$ may have a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

Once the total velocity average cross-section parameter $\langle \sigma_{tot} v \rangle$ is determined in accordance with the method described above, another aspect of the invention provides a method for calibrating a mass spectrometer which measures a signal $S_b$ corresponding to second residual particles in a second vacuum environment comprising second sensor atoms trapped in a second cold atom sensor trap of trap depth potential energy $U^*$. The method comprises: using the total velocity average cross-section parameter $\langle \sigma_{tot} v \rangle$ determined in accordance with the method described above wherein the second sensor atoms are the same as the sensor atoms and the second residual particles are the same as the residual particles; measuring a loss rate $\Gamma_{loss}(U=U^*)$ of second sensor atoms from the second cold atom sensor trap at the trap depth potential energy $U^*$; measuring a signal $S_b$ corresponding to the second residual particles in the second vacuum environment using the mass spectrometer at the same trap depth potential energy $U^*$; and determining a calibration factor $i_s$ for the mass spectrometer according to:

$$i_s = \frac{S_b \langle \sigma_{tot} v \rangle}{(k_B T)\Gamma_{loss}(U)} f(U = U^*, U_d).$$

Once the number density $n_b$ of second residual particles in the second vacuum environment determined in accordance with the method described above, another aspect of the invention provides a method for calibrating a mass spectrometer which measures a signal $S_b$ of second residual particles in a second vacuum environment comprising second sensor atoms trapped in a second cold atom sensor trap of trap depth potential energy $U^*$. The method comprises: using the number density $n_b$ of second residual particles in the second vacuum environment determined in accordance with the method described above wherein the second sensor atoms are the same as the sensor atoms and the second residual particles are the same as the residual particles; measuring a loss rate $\Gamma_{loss}(U=U^*)$ of second sensor atoms from the second cold atom sensor trap at the trap depth potential energy $U^*$; measuring a signal $S_b$ corresponding to the second residual particles in the second vacuum environment using the mass spectrometer at the same trap depth potential energy $U^*$; and determining a calibration factor $i_s$ for the mass spectrometer according to:

$$i_s = \frac{s_b}{n_b(k_B T)}.$$

Another aspect of the invention provides a method for determining number densities $n_{1,2,3,\ldots}$ of a plurality of second residual particles in a second vacuum environment comprising second sensor atoms trapped in a second cold atom sensor trap. The method comprises, for each of the plurality of second residual particles, using the total velocity average cross-section parameter $\langle \sigma_{tot} v \rangle$ determined in accordance with the method described above wherein the second sensor atoms are the same as the sensor atoms and the second residual particles are the same as the residual particles, to thereby obtain a plurality of total velocity average cross-section parameters $\langle \sigma_{tot} v \rangle_{1,2,3,\ldots}$ corresponding to the plurality of second residual particles. The method comprises iterating a process which comprises in each iteration: varying the trap depth potential energy U for the cold atom sensor trap in which the sensor atoms are trapped and measuring the loss rate $\Gamma_{loss}(U)$ of the sensor atoms from the cold atom sensor trap, to thereby obtain a plurality of loss rates $\Gamma_{loss_{1,2,3,\ldots}}(U_{1,2,3,\ldots})$ at different trap depth potential energies $U_{1,2,3,\ldots}$. The plurality of loss rates $\Gamma_{loss_{1,2,3,\ldots}}(U_{1,2,3,\ldots})$ is greater than or equal to the plurality of second residual particles. The method comprises: determining corresponding values of $U_{d_{1,2,3,\ldots}}$ for the second residual particles according to $$U_{d_{1,2,3,\ldots}} = \sqrt{2k_B T / m_{bg}} \frac{4\pi \hbar^2}{m_t \langle \sigma_{tot} v \rangle_{1,2,3,\ldots}};$$

and solving a system of equations having the form:

$$\Gamma_{loss}(U_1) = \tag{13A}$$
$$n_1 \langle \sigma_{tot} v \rangle_1 \left[1 - \sum_{j=1}^{N} \beta_j \left(\frac{U_1}{U_{d1}}\right)^j\right] + n_2 \langle \sigma_{tot} v \rangle_2 \left[1 - \sum_{j=1}^{N} \beta_j \left(\frac{U_1}{U_{d2}}\right)^j\right] +$$
$$n_3 \langle \sigma_{tot} v \rangle_3 \left[1 - \sum_{j=1}^{N} \beta_j \left(\frac{U_1}{U_{d3}}\right)^j\right] + \ldots$$

$$\Gamma_{loss}(U_2) = \tag{13B}$$
$$n_1 \langle \sigma_{tot} v \rangle_1 \left[1 - \sum_{j=1}^{N} \beta_j \left(\frac{U_2}{U_{d1}}\right)^j\right] + n_2 \langle \sigma_{tot} v \rangle_2 \left[1 - \sum_{j=1}^{N} \beta_j \left(\frac{U_2}{U_{d2}}\right)^j\right] +$$
$$n_3 \langle \sigma_{tot} v \rangle_3 \left[1 - \sum_{j=1}^{N} \beta_j \left(\frac{U_2}{U_{d3}}\right)^j\right] + \ldots$$

$$\Gamma_{loss}(U_3) = \tag{13C}$$
$$n_1 \langle \sigma_{tot} v \rangle_1 \left[1 - \sum_{j=1}^{N} \beta_j \left(\frac{U_3}{U_{d1}}\right)^j\right] + n_2 \langle \sigma_{tot} v \rangle_2 \left[1 - \sum_{j=1}^{N} \beta_j \left(\frac{U_3}{U_{d2}}\right)^j\right] +$$
$$n_3 \langle \sigma_{tot} v \rangle_3 \left[1 - \sum_{j=1}^{N} \beta_j \left(\frac{U_3}{U_{d3}}\right)^j\right] + \ldots$$

$$\vdots \qquad \vdots \qquad \vdots$$

to thereby obtain the number densities $n_{1,2,3,\ldots}$ of the plurality of second residual particles in the second vacuum environment.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1A:
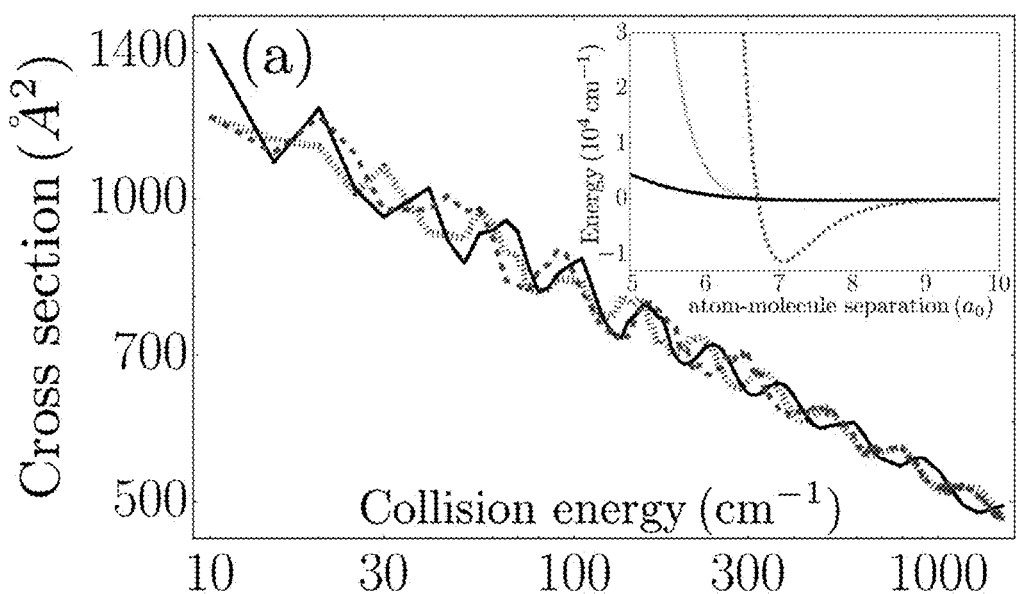
FIG. 1A is a plot showing the total velocity dependent cross section computed using the time-independent coupled channel (CC) approach for an atom-diatomic molecule collision using three different potential energy surfaces (PESs), with each PES having the same long range van der Waals potential, but different short range core potentials.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide methods for determining a total collision rate $\Gamma_{tot}=n_b\langle\sigma_{tot}v\rangle$ and a total velocity averaged cross-section parameter $\langle\sigma_{tot}v\rangle$ between a species pair (a trapped atom and a residual particle) based on measurement of the loss rate $\Gamma_{loss}=n_b\langle\sigma_{loss}v\rangle$ of trapped sensor atoms from a cold atom trap due to collisions with the residual particles in a vacuum environment at a variety of trap depths (U), where $\sigma_{loss}$ is a function of the trap depth U and $\langle\sigma_{loss}v\rangle=\langle\sigma_{loss}(U)v\rangle$ is velocity averaged cross-section of the species pair at a given trap depth U. At U=0, the loss rate $\Gamma_{loss}$ equals the total collision rate $\Gamma_{tot}$.

Aspects of the invention provide using the total cross-section parameter $\langle\sigma_{tot}v\rangle$ for species pair determined using the above technique for determining the number density $n_b$ (or pressure $P_b$) of the residual particles in a vacuum environment by: measuring the loss rate $\Gamma_{loss}=n_b\langle\sigma_{loss}v\rangle$ of trapped sensor atoms from a cold atom trap due to collisions with the residual particles in a vacuum environment at a given trap depth (U); using the zero-depth velocity averaged cross-section parameter $\langle\sigma_{tot}v\rangle$ to determine the velocity averaged cross-section of the species pair at a given trap depth U (i.e. $\langle\sigma_{loss}v\rangle=\langle\sigma_{loss}(U)v\rangle$); and determining the number density $n_b$ according to $$n = \frac{\Gamma_{loss}}{\langle\sigma_{loss}(U)v\rangle}.$$

Because, at U=0, the loss rate $\Gamma_{loss}$ should be equal to the total collision rate $\Gamma_{tot}$, the inventors have determined that the measured loss rate $\Gamma_{loss}=n\langle_{loss}v\rangle$ may be expanded according to:

$$\Gamma_{loss}=n_b\langle\sigma_{loss}v\rangle=n_b\langle\sigma_{tot}v\rangle\cdot(1-p_{QM}) \quad (1)$$

where $p_{QM}$ is defined as the probability that a sensor atom remains in the trap after the collision. The inventors have determined that there is a relationship that explains this probability $p_{QM}$ in terms of the parameter $U_d$ which represents the characteristic quantum diffraction energy associated with a position measurement of the sensor atom that localizes the sensor atom to a region of average cross-section $\bar{\sigma}$ and where the parameter $U_d$ is given by:

$$U_d \equiv \frac{4\pi\hbar^2}{m_t\bar{\sigma}} \quad (2)$$

where h is the reduced Planck's constant and $m_t$ is the mass of the trapped atom. The average cross-section $\bar{\sigma}$ may be defined according to:

$$\bar{\sigma}=\langle\sigma_{tot}v\rangle/\bar{v} \quad (3)$$

where $$\bar{v}=\sqrt{2k_BT/m_{bg}} \quad (4)$$

is the most probable relative velocity given the Maxwell-Boltzmann velocity distribution of the residual particles and where $m_{bg}$ is the mass of the residual particle.

Equations (2)-(4) demonstrate that the relationship that explains this probability $p_{QM}$ in terms of the parameter $U_d$ is dependent only on the masses ($m_t$, $m_{bg}$) of the trapped and residual particles. This relationship that explains this probability $p_{QM}$ may be modelled by a polynomial expansion in the scaled trap depth $$\left(\frac{U}{U_d}\right)$$

according to:

$$p_{QM} \equiv \sum_{j=1}^{N}\beta_j\left(\frac{U}{U_d}\right)^j \quad (5)$$

where N may be selected to be a suitably large integer and the $\beta_j$s are parameters of the model.

The inventors have determined further that the combination of equations (1) and (5):

$$\frac{\langle\sigma_{loss}v\rangle}{\langle\sigma_{tot}v\rangle} = 1 - \sum_{j=1}^{N}\beta_j\left(\frac{U}{U_d}\right)^j \quad (6)$$

is universal in the sense that the coefficients $\beta_j$ on the right hand side of equation (6) are independent of the short range details of the trap's potential energy, independent of the strength of the van der Waals interaction (i.e. the value for $C_6$), and independent of the masses of the trapped and residual particles. Without wishing to be bound by theory, the inventors speculate that this universality is due to thermal averaging and the quantum measurement properties of quantum diffractive collisions. This expansion is also universal for potentials other that van der Waals—i.e. for potentials of the form $C_n/r^n$ with n=4, 5 where the set of coefficients $\beta_j$ in equation (5) is distinct for each n. Thus, the long range shape of the interaction potential is encoded in the coefficient values ($\beta_j$ in equation (5)); the thermally-averaged total cross section parameter $\langle\sigma_{tot}v\rangle$ and particle masses are encoded in the parameter $U_d$.

It follows from this universally that the thermally-averaged total and loss collision cross sections $\langle\sigma_{tot}v\rangle$, $\langle\sigma_{loss}v\rangle$ for small U (and the coefficients $\beta_j$ in equation (5)) are independent of the short range part of the potential. To illustrate this, consider FIG. 1A which shows the total velocity dependent (not velocity averaged) cross section computed using the time-independent coupled channel (CC) approach (described by A. Arthurs and A. Dalgarno, Proc. R. Soc. London, Ser. A 256, 540 (1960)) for an atom-diatomic molecule collision using three potential energy surfaces (PES). Each PES has the same long range van der Waals potential but radically different short range core potentials, differing in depth by more than a factor of $10^4$. The inset of FIG. 1A shows the PES cross-sections at a 90° Jacobi angle of approach. The FIG. 1A cross sections exhibit core-dependent oscillations super-imposed on a trend defined by the long-range part of the potential. The effect of thermal averaging is clear: while an accurate prediction of the collision rate for a given velocity requires knowledge of the potential core, averaging the cross section over one or more oscillations removes the core-dependent effects. In particular, $\langle\sigma_{tot}v\rangle=[0.361, 0.361, 0.363]\times10^{-8}$ cm$^3$/s for the PESs shown respectively as dark solid, dotted, and dashed lines in FIG. 1A.

Without wishing to be bound by theory, the inventors are of the view that the loss cross section for small U is also independent of the short range part of the potential because inelastic and small impact parameter elastic collisions that probe the PES core tend to lead to loss for shallow traps.

Figure 1B:
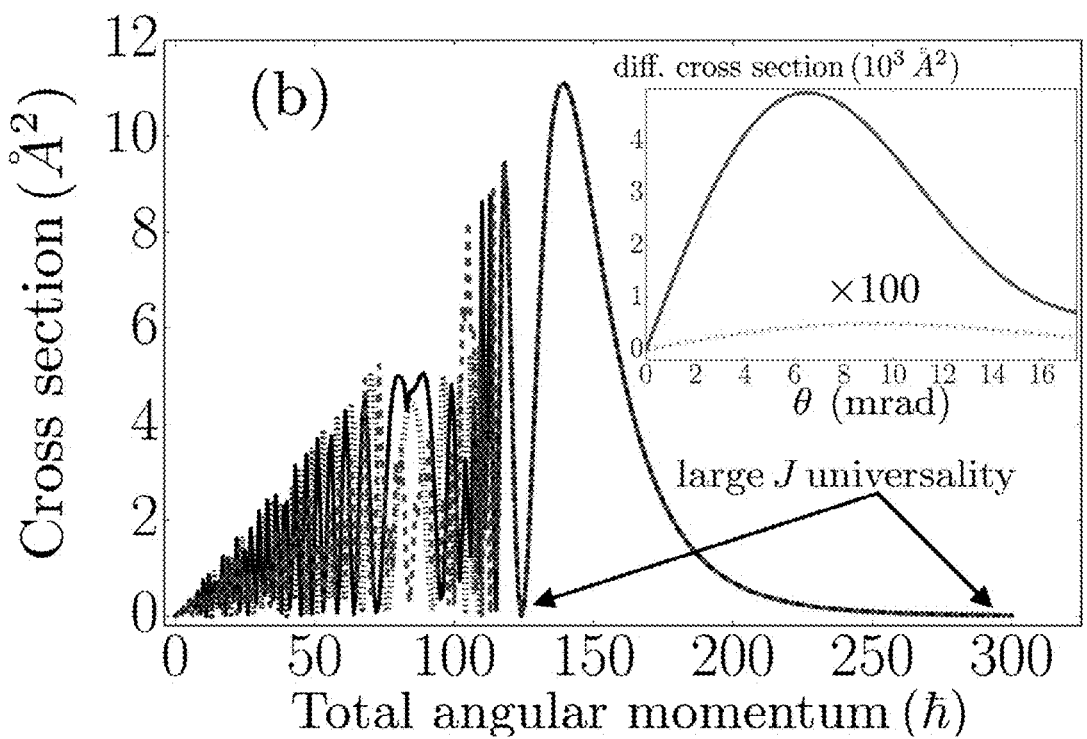
FIG. 1B is a plot showing the cross-sections for the three FIG. 1A PESs versus total angular momentum J (in units of $\hbar$) for a collision energy of 300 cm$^{-1}$.

Thus, the loss rate $\Gamma_{loss}$ departs from the total collision rate $\Gamma_{tot}$ due to quantum diffractive collisions occurring at exceedingly large impact parameters and correspondingly large angular momenta where the cross section is independent of the PES core. FIG. 1B shows the cross-section versus total angular momentum, J, for the three PESs shown in FIG. 1A at a collision energy of 300 cm¹. While the curves core-dependent oscillations are below angular momentums of J=125 h, the curves exhibit the same universal shape, independent of the core potential above J=125 $\hbar$. The scattering angles of such collisions are also relatively small (<1 mrad for $\hbar$ U=1 mK and a collision energy of 300 cm$^{-1}$), and the inset of FIG. 1B shows that the differential cross section is dominated by large impact parameter elastic scattering (solid), more than a factor of 1000 times larger than inelastic scattering (dashed plot) for θ<10 mrad, arising primarily from low J collisions.

Figure 1C:
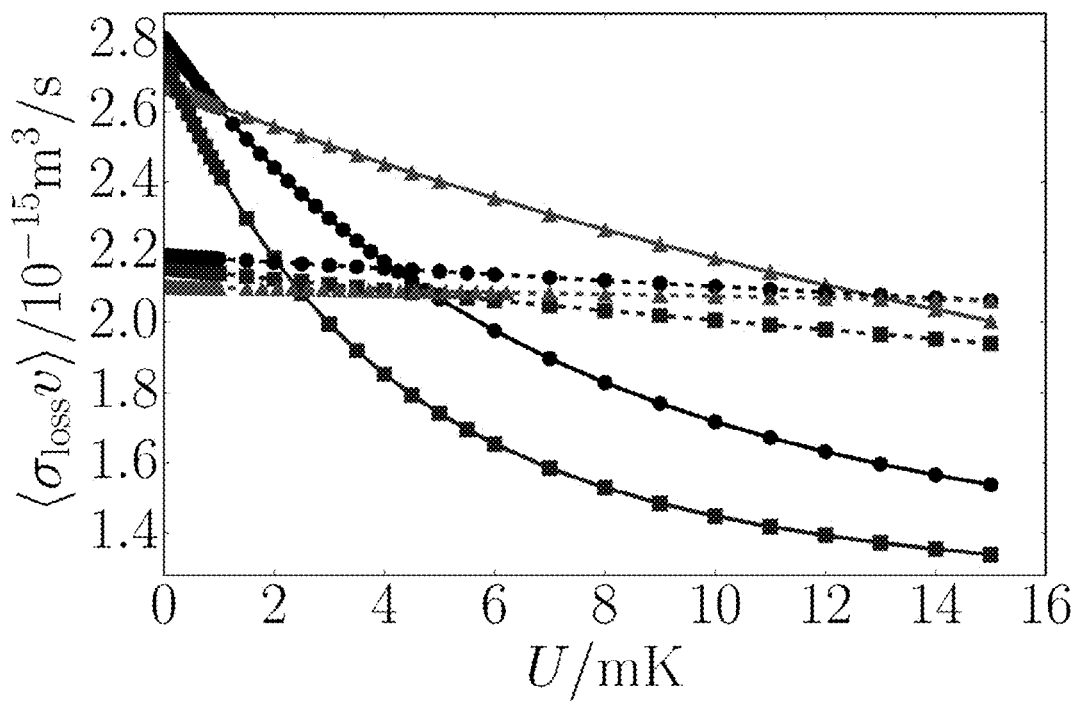
FIG. 1C shows a plot of the ratio of $\langle \sigma_{loss} v \rangle / \langle \sigma_{tot} v \rangle$ determined by a theoretical model versus the trap depth (U).

FIG. 1C shows model-based calculations for the velocity average loss cross-sections $\langle \sigma_{loss} v \rangle$ (in units of $10^{-15}$ m³/s) at 21° C. versus trap depth for He (triangles), Ar (circles), and Xe (squares) residual particles colliding with Li (dashed lines) and Rb (solid lines) trapped particles. For the case of the FIG. 1C plots, the interatomic interaction was modeled as a Lennard-Jones potential, $$V(R) = 4\epsilon\left[\left(\frac{r_0}{R}\right)^{12} - \left(\frac{r_0}{R}\right)^6\right] = \frac{C_{12}}{R^{12}} - \frac{C_6}{R^6},$$

where $\in$ is the depth of the potential well and $r_0$ is the range of the core repulsion. The $C_6$ values were those described by A. Derevianko, S. G. Porsev, and J. F. Babb, Atomic Data and Nuclear Data Tables 96, 323 (2010) and the potential depth was E=50 cm$^{-1}$. It will be appreciated (and explained below) that while the FIG. 1C plots show model-based calculations, data of the type shown in FIG. 1C can be measured experimental using a cold atom trap.

Figure 1D:
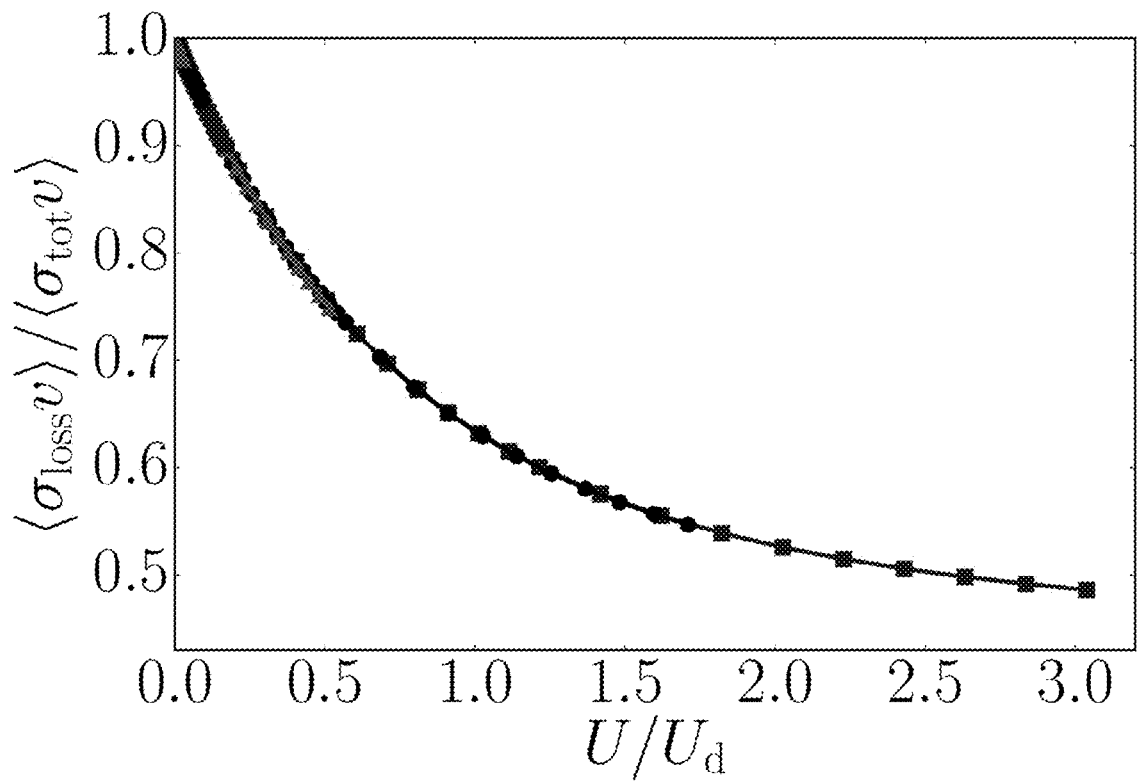
FIG. 1D shows the same FIG. 1C plots, except that the abscissa is the scaled trap depth parameter $$\left(\frac{U}{U_d}\right).$$

When these FIG. 1C loss cross-sections $\langle \sigma_{loss} v \rangle$ are normalized by their values at U=0 (i.e. their respective total cross-sections $\langle \sigma_{tot} v \rangle$) and plotted versus the scaled trap depth $$\left(\frac{U}{U_d}\right),$$

the result is represented by the plots shown in FIG. 1D, where all of the FIG. 1C curves collapse into a single curve (i.e. (1-$p_{QM}$)) shown in equation (1), with the coefficients $\beta_j$ provided in the first numerical row of Table I below. The inventors have experimentally determined that the residuals for each calculation (from the universal curve (1-$p_{QM}$)) are below 0.1% for trap depths up to U=2.5 mK.

TABLE 1

| | | Coefficients $\beta_j$ of Relationship Given by Equation (6) | | | | | | |
|---|---|---|---|---|---|---|---|---|
| T (K) | $\in$ (cm$^{-1}$) | $\beta_1$ | $\beta_2$ | $\beta_3$ | $\beta_4$ | $\beta_5$ | $\beta_6$ | $p_{QM}^{(0.3)}$ |
| 294 | 50 | 0.6730 (7) | −0.477 (3) | 0.228 (6) | −0.0703 (42) | 0.0123 (14) | −0.0009 (2) | 0.165 |
| 294 | 50 | 0.6754 | −0.4992 (2) | 0.2775 (6) | −0.1165 (7) | 0.0321 (4) | −0.00413 (8) | 0.164 |
| 273 | 50 | 0.6754 | −0.4996 (2) | 0.2779 (6) | −0.1165 (7) | 0.0319 (4) | −0.00408 (8) | 0.164 |
| 373 | 50 | 0.6749 | −0.4970 (2) | 0.2759 (5) | −0.1165 (6) | 0.0326 (4) | −0.00433 (8) | 0.164 |
| 40 | 50 | 0.6754 | −0.4991 (7) | 0.2687 (14) | −0.1011 (12) | 0.0228 (4) | −0.00223 (6) | 0.164 |
| 3 | 50 | 0.6471 (7) | −0.4317 (21) | 0.1889 (23) | −0.0516 (11) | 0.0078 (2) | −0.00048 (2) | 0.160 |
| 988 | 50 | 0.7051 | −0.5389 (1) | 0.3086 (3) | −0.1369 (5) | 0.0421 (3) | −0.00640 (9) | 0.170 |
| 294 | 500 | 0.6736 | −0.4976 (2) | 0.2765 (5) | −0.1161 (7) | 0.0320 (4) | −0.00411 (8) | 0.164 |
| 294 | 5000 | 0.6736 | −0.4977 (2) | 0.2763 (7) | −0.1157 (8) | 0.0318 (4) | −0.00408 (9) | 0.164 |
| 294 | 50000 | 0.6736 | −0.4977 (2) | 0.2767 (5) | −0.1162 (7) | 0.0320 (4) | −0.00412 (8) | 0.164 |

Table 1 shows the first six coefficients $\beta_j$ (for j=1, 2, ... 6) for the relationship described by equations (1), (6) and (7) above. The first row of Table 1 shows the $\beta_j$ coefficients for van der Waals collisions at room temperature extracted from the best fit to the calculations in FIG. 1D. The following rows of Table 1 show the $\beta_j$ values fit to calculations for trapped Rb and residual Ar at different temperatures and potential (trap) depths. Based on the $p_{QM}$ values at $$\frac{U}{U_d} = 0.3$$

(the rightmost column in Table 1), the results are insensitive over a relatively large temperature range (from 40-373K) and to radical changes of the core potential depth $\in$ (see the last three rows). However, at temperatures of 3K and 988K, there is some deviation in the $p_{QM}$ values. Without wishing to be bound by theory, the inventors are of the view that at 3K, the thermal average is too narrow and does not sample a large enough velocity range to average away the cross section oscillations (see FIG. 1A), and at 988 K, the temperature is too high and involves collisions at very large velocities whose cross section is influenced by the core shape of the potential. Despite this deviation at temperature extremes, the systematic error in $\langle \sigma_{tot} v \rangle$ (and thus the number density $n_b$ of the residual particles) that would result by naïvely fitting experimental data following the predictions at 3K and 988K to the (equation (6) curve derived for T=294K (the first row of Table 1) is only 0.2% and 0.17% respectively.

While the embodiments described herein involve the determination of the coefficients $\beta_j$ based on theoretical model of particle interaction, it is conceivable that the coefficients $\beta_j$ could be determined experimentally in some embodiments—e.g. by comparing measured data to the model of sensor atom loss (e.g. equation (1)).

EXPERIMENTS

Figure 7:
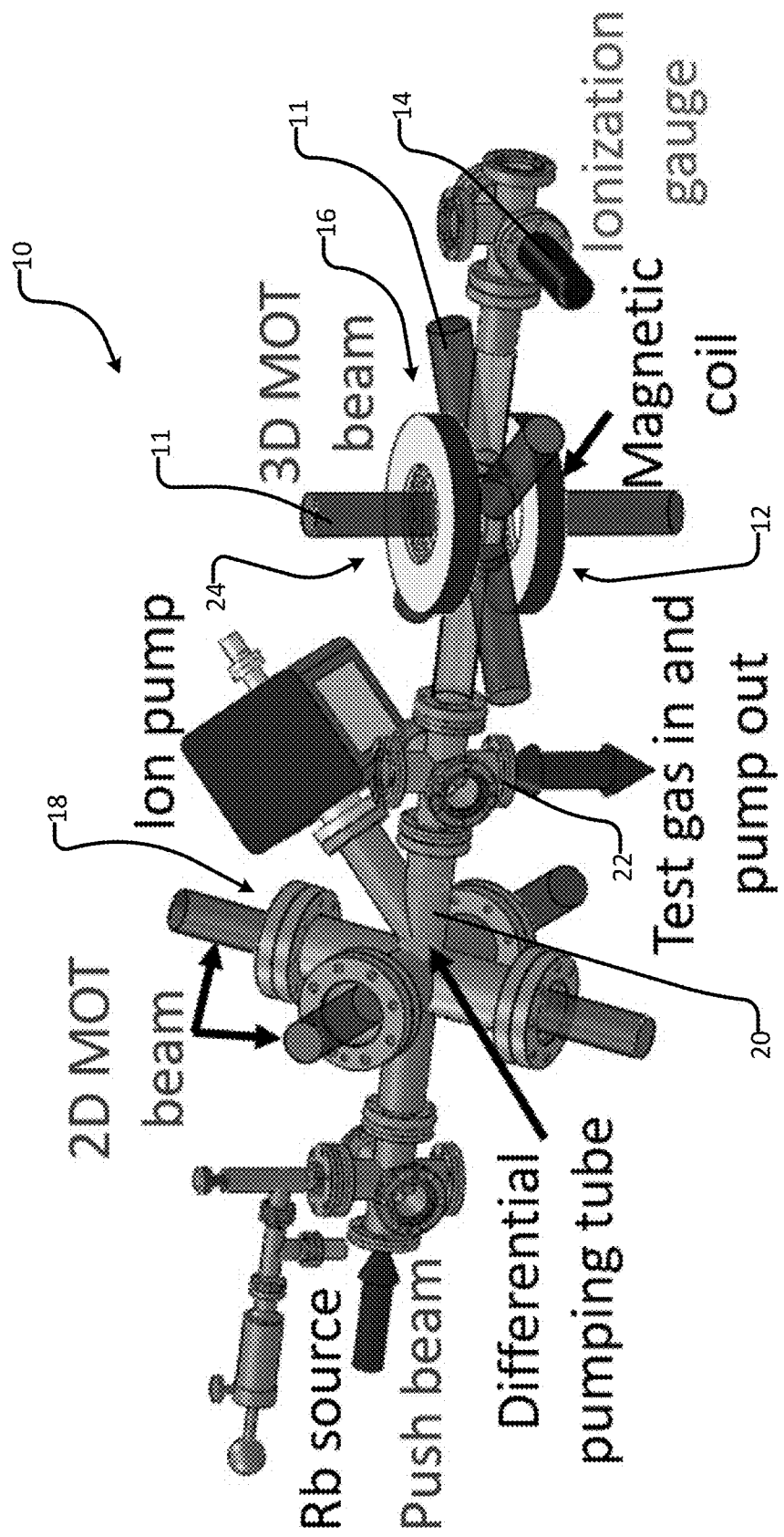
FIG. 7 shows the experimental set up for the experiments described herein and represents a pressure measurement apparatus according to a particular embodiment of the invention.

FIG. 7 is a schematic illustration of an apparatus 10 on which the experiments described below were conducted and a pressure measurement apparatus 10 according to a particular embodiment of the invention.

Pressure measurement apparatus 10 comprises a low base pressure ($10^{-10}$ Torr) test section 12 housing an ionization gauge 14 and comprising a six-beam magneto-optic trap (3D MOT) 16. The MOT 16 was loaded by a flux of cold $^{87}$Rb atoms entering from a secondary 2D MOT chamber 18 through a low conductance differential pumping tube 20. In other embodiments, other atoms or particles (other than $^{87}$Rb) could be used as the "cold" trapped atoms. The residual gas was introduced into the test section 12 through a leak valve 22 connected to a secondary chamber backed by a turbo-pump, and the apparatus 10 was designed to ensure that there was no pressure gradient between the ionization gauge 14 and the $^{87}$Rb sensor atoms trapped in test section 12.

Two lasers, a pump and a repump (shown schematically in FIG. 7 as red cylinders 11), were used for cooling and trapping Rb in the 2D and 3D MOTs. The pump laser 11 was tuned 12 MHz below the $D_2$ ($^2S_{1/2} \rightarrow {^2P_{3/2}}$), F=2-3' transition, while the overlapping repump laser 11 was resonant with the F=1-2' transition. The pump and repump laser beams 11 (which were 2.4 cm in diameter) were split into three beams and retro-reflected to create the 3D MOT 16 with total powers of 100 mW and 2 mW, respectively. The magnetic field configuration was a spherical quadrupole with an axial gradient of 13.6 G/cm.

The pressure measurement cycle started by loading $10^7$ atoms (to be trapped) into the 3D MOT. The atom number (i.e. the number of trapped atoms in the magneto-optical trap (MOT)—$^{87}$Rb in the case of the experimental embodiment discussed herein) was determined by the MOT fluorescence. As is well known in the art of cold atom traps, when an atom escapes the trap, it releases a photon which can be measured by a suitable photodetector (not shown) and the MOT fluorescence $V_{MOT}$ (detected by the photodetector) is generally proportional to the atom number $N_{MOT}$. To avoid counting errors due to high optical depth, the initial atom number (i.e. the initial number of trapped atoms in the magneto-optical trap (MOT)) was limited, to ensure that the voltage reading of the fluorescence photodetector ($V_{MOT}$) was linear with atom number $N_{MOT}$. After loading, the atoms were cooled and transferred into the F=1 state by changing the pump tuning from 12 to 60 MHz below resonance, waiting 50 ms, and then eliminating the repump light while leaving the pump light on for 4 ms. A magnetic trap (MT) 24 was established in test section 12 after the pump light was extinguished by increasing the magnetic field gradient to either 122 or 272 G/cm, depending on the maximum trap depth desired. This procedure captured $2 \times 10^6$ (±1.2%)|F=1, MF=–1⟩ state atoms in the MT 24, while ejecting atoms in the other MF states, where |F=1, MF=–1⟩ uses the Dirac bra-ket notation known in the art of quantum mechanics. The magnetically trapped atoms in MT 24 were then held in complete darkness for a time t, and some were lost due to collisions with residual particles in the vacuum of test section 12. At the end of the holding time, the atoms were subjected to a RF field that sets the trap depth by ejecting all atoms above a certain energy from MT 24. The remaining atoms were recaptured in the 3D MOT 16 and their fluorescence, $V_{MT}$, was recorded. This fluorescence, $V_{MT}$, measurement (which is proportional to the atom number $N_{MT}$ of trapped atoms) was normalized by the 3D MOT fluorescence, $V_{MOT}$, just before transfer to the MT. A series of measurements for different holding times were carried out and the MT loss rate ($\Gamma_{loss}$) was extracted from, $$\frac{N_{MT}}{N_{MOT}} \propto \frac{V_{MT}}{V_{MOT}} = \frac{V_{MT}}{V_{MOT}}\bigg|_{(t=0)} e^{-\Gamma_{loss} t} \quad (7)$$

Where: $N_{MT}$ is the number of trapped particles in the magnetic trap (MT) 24 (after being transferred from the 3D MOT 12); $N_{MOT}$ is the initial number of trapped particles in the 3D magneto-optical trap (MOT) 12; $V_{MT}$ is the fluorescence of the trapped particles in the MT 24; $V_{MOT}$ is the fluorescence of the trapped particles in 3D MOT 12; $\Gamma_{loss}$ is the loss rate of the trapped particles inside the MT 24; and t is the holding time.

Collision-induced heating of the sensor ensemble and an overestimate in the loss rates were avoided by limiting the hold times t such that the fraction of heated atoms in the remaining ensemble ($f = 1 - e^{(\Gamma_{tot} - \Gamma_{loss})t}$) was always less than 20%.

If $\langle \sigma_{tot} v \rangle$ was known, then a single value of $\Gamma_{loss}(U)$ at any trap depth U provides the number density $n_b$ according to:

$$n_b = \Gamma_{loss}(U) / [\langle \sigma_{tot} v \rangle \cdot (1 - p_{QM})] \quad (8)$$

where this expression represents a combination of equations (1) and (5)

If $\langle \sigma_{tot} v \rangle$ was not known, then by repeating the measurement of $\Gamma_{loss}(U)$ at a variety of trap depths (U), the normalized loss rate function $\Gamma_{loss}(U)/\Gamma_{loss}(0)$ can be obtained and fit to the relationship $(1 - p_{QM})$ to find the value of $U_d$, thus determining $\langle \sigma_{tot} v \rangle$ and $n_b$. More specifically, once $U_d$ is obtained, then the combination of equations (2), (3) and (4) may be used to determine $\langle \sigma_{tot} v \rangle$ according to:

$$\langle \sigma_{tot} v \rangle = \sqrt{2k_B T/m_{bg}} \frac{4\pi \hbar^2}{m_t U_d} \quad (8A)$$

and, once $\langle \sigma_{tot} v \rangle$ is determined, equations (5) and (8) may be used to determine $n_b$.

With this latter method (i.e. where $\langle \sigma_{tot} v \rangle$ was unknown), the inventors were able to use the method could be used to calibrate an ionization gauge for different species without using ab initio computations of the interaction potentials. It was assumed the ionization gauge reading was linear in the background density: $P_b = i_g n_b k_B T$ where $k_B$ is Boltzmann's constant, T is the temperature of the background particles, and $i_g$ is the (unknown) gauge calibration factor (species-dependent response) of the ionization for the background gas. Using the three experimentally measured quantities ($\Gamma_{loss}$, T, $P_b$) at a series of trap depths (U), the quantity on the left hand side of the following expression was constructed:

$$\frac{\Gamma_{loss}(U)}{P_b/(k_B T)} = \frac{\langle \sigma_{tot} v \rangle}{i_g} \left[ 1 - \sum_{j=1}^{N} \beta_j \left( \frac{U}{U_d} \right)^j \right] \quad (9)$$

and fit to the right hand side of this expression using two free parameters $\langle \sigma_{tot} v \rangle$ and $i_g$ (it being observed that $U_d$ is determined by $\langle \sigma_{tot} v \rangle$). This construction has the advantage that the residual particle pressure need only remain constant during a single MT lifetime measurement or only during a single MT hold time duration once the initial MT number is known, since shot-to-shot pressure variations are normalized out by dividing $\Gamma_{loss}$ by $P_b$.

Table II below shows the results of these ionization gauge calibration experiments.

|     | $\langle \sigma_{tot} v \rangle_{exp}$ ($10^{-15}$ m³/s) | $i_g$ | $i_{g,exp}$ |
| --- | --- | --- | --- |
| He  | 2.40 (0.12) (±5.0%) | 0.18 | 0.163 (±4.9%) |
| Ar  | 2.77 (0.05) (±1.8%) | 1.29 | 1.238 (±2.1%) |
| Xe  | 2.71 (0.03) (±1.1%) | 2.75 | 2.511 (±1.2%) |
| $H_2$ | 5.09 (0.15) (±2.9%) | 0.46 | 0.559 (±3.2%) |
| $CO_2$ | 2.79 (0.08) (±1.2%) | 1.43 | 0.958 (±1.5%) |
| $N_2$ | 3.11 (0.05) (±1.6%) | 0.94 (±2.0%) | 0.943 (±2.0%) |

Specifically, Table II shows experimentally determined total cross-sections $\langle \sigma_{tot} v \rangle_{exp}$ and gauge calibration factors $i_{g,exp}$ extracted from fitting measured trap loss data (the left hand side of equation (9)) to the right hand side of equation (9). The expected ionization gauge factors in the column head $i_g$ are the industry standard values (with a 10% to 20% uncertainty) except for the $N_2$ factor which was provided by a calibration at the National Institute of Standards and Technology (NIST) for this gauge. Only the values for $\langle \sigma_{tot} v \rangle_{exp}$ were needed for a $^{87}$Rb cold atom pressure standard.

Method for Determining Total Velocity Averaged Cross-Section $\langle \sigma_{tot} v \rangle$ and Experiments Relating to Same FIGS. 2A-2F show experimentally obtained data relevant to a method for determining the total velocity averaged cross-section $\langle \sigma_{tot} v \rangle$ in accordance with a particular embodiment.

Figure 2A:
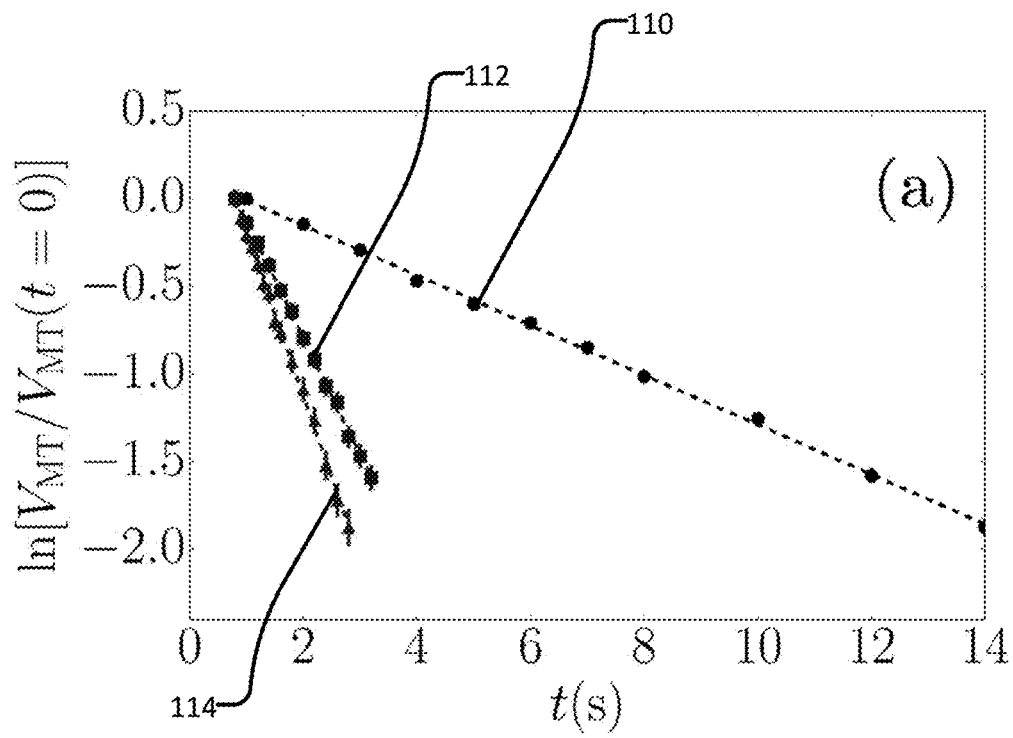
FIGS. 2A-2F are various plots of data obtained in experiments performed by the inventors in relation to determining the total velocity averaged cross-section $\langle \sigma_{tot} v \rangle$ for various residual particles.

FIG. 2A is a plot which relates the number of "cold" trapped $^{87}$Rb sensor atoms in the above-described magnetic trap versus time. More specifically, FIG. 2A shows on its y-axis, the natural logarithm of the relative atom number (i.e. a ratio of the atom number at a given time ($N_{MT} \propto V_{MT}$) to the atom number at time t=0 ($N_{MT}(t=0) \propto V_{MT}(t=0)$) in the magnetic trap ln $$[V_{MT}/V_{MT}(t=0)]$$

versus time. In particular, the atom number ($N_{MT} \propto V_{MT}$) may be determined in the inventor's experimental set-up by measuring the atomic fluorescence upon recapture of $^{87}$Rb atoms in the magneto-optical trap (MOT). Circular data point curve 110 (which represents the lowest rate of decay of trapped sensor atoms shown in FIG. 2A) illustrates the decay of the trapped $^{87}$Rb sensor atoms prior to adding any residual particles to the vacuum. FIG. 2A shows that the trapped sensor atoms have a background decay rate, which may be due to a variety of loss mechanisms including, in part, collisions with residual background gasses present in the vacuum. Square data point curve 112, which is steeper than curve 110, shows the rate of escape of $^{87}$Rb sensor atoms after introducing a partial pressure of Ar atoms with $P_{Ar}$=8.9n Torr. Triangle data point curve 114, which is steeper still, shows the rate of escape of $^{87}$Rb sensor atoms after introducing a partial pressure of Ar atoms with $P_{Ar}$=11n Torr.

Figure 2B:
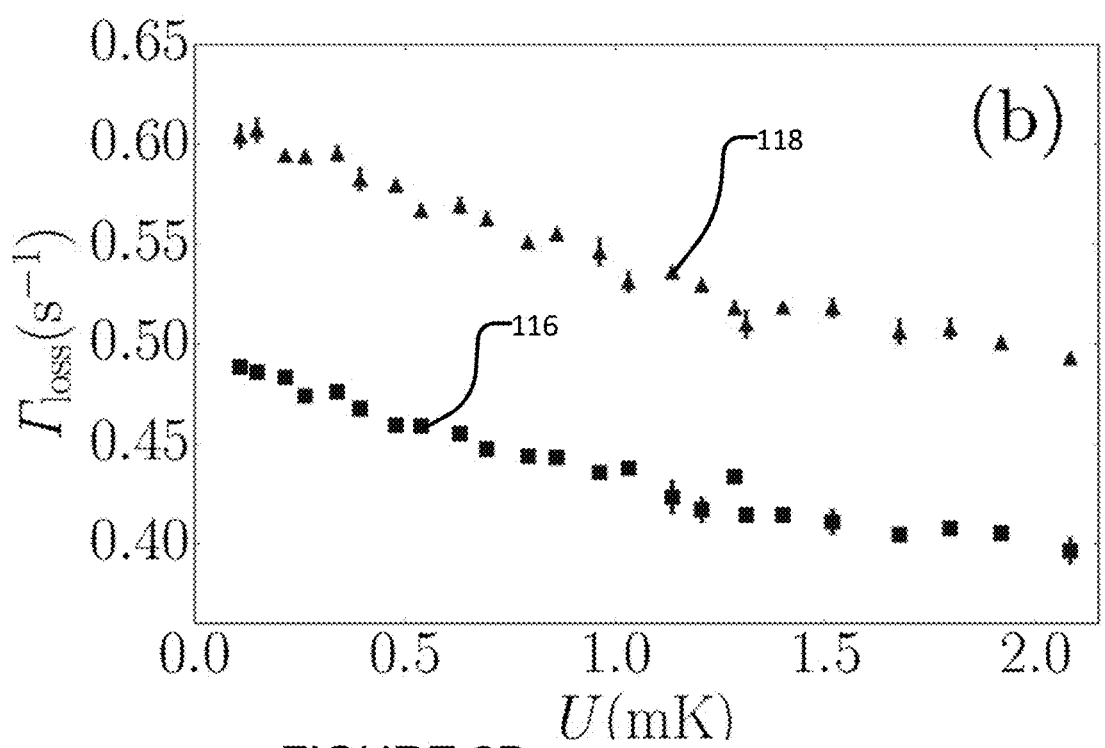

FIG. 2B shows the measured magnetic trap (MT) loss rate $\Gamma_{loss}$ (in units of s$^{-1}$) as a function of trap depth (U) in units of mK. The FIG. 2B data relates to introduced Xe residual particles for $P_{Xe}$=14.5n Torr (square data point curve 116) and for $P_{Xe}$=18n Torr (triangle data point curve 118). The FIG. 2B plots are shown after subtracting background losses—i.e. the background loss rate (based on data of the type shown in curve 110 of FIG. 2A) is subtracted from the loss rates shown in FIG. 2B, so that the FIG. 2B loss rates $\Gamma_{loss}$ are due only to collisions between Xe and the trapped $^{87}$Rb sensor atoms.

Figure 2C:
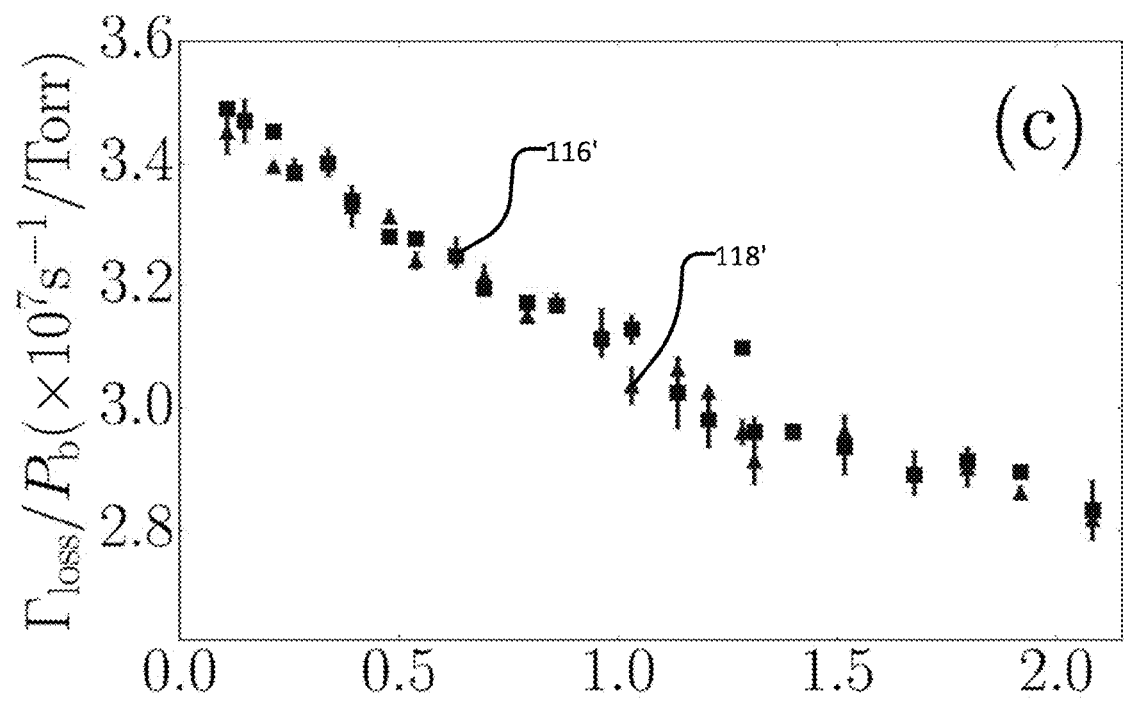

FIG. 2C shows two curves 116' and 118' which represent the FIG. 2B curves 116, 118 divided by the respective pressure readings ($P_{Xe}$) for each measurement. In the case of FIG. 2B, an approximate value of $P_{Xe}$ was obtained by measuring $P_{Xe}$ using ionization gauge 14 (see FIG. 7). As explained above, and in more detail below, the ionization gauge 14 measurement of $P_{Xe}$ is at least approximately proportional to the actual pressure of $P_{Xe}=n_{Xe}k_BT$ by a proportionality constant $i_g$ and so the relative effect of scaling to the curves 116, 118 to get from FIG. 2B to curves 116', 118' of FIG. 2C is at least approximately the same as dividing by the true pressure of Xe. It can be see from FIG. 2C that the FIG. 2B curves 116, 118 move "on top" of one another when divided by their pressures $P_{Xe}$ to become the FIG. 2C curves 116', 118'. This observation is consistent with equation (9) above.

Figure 2D:
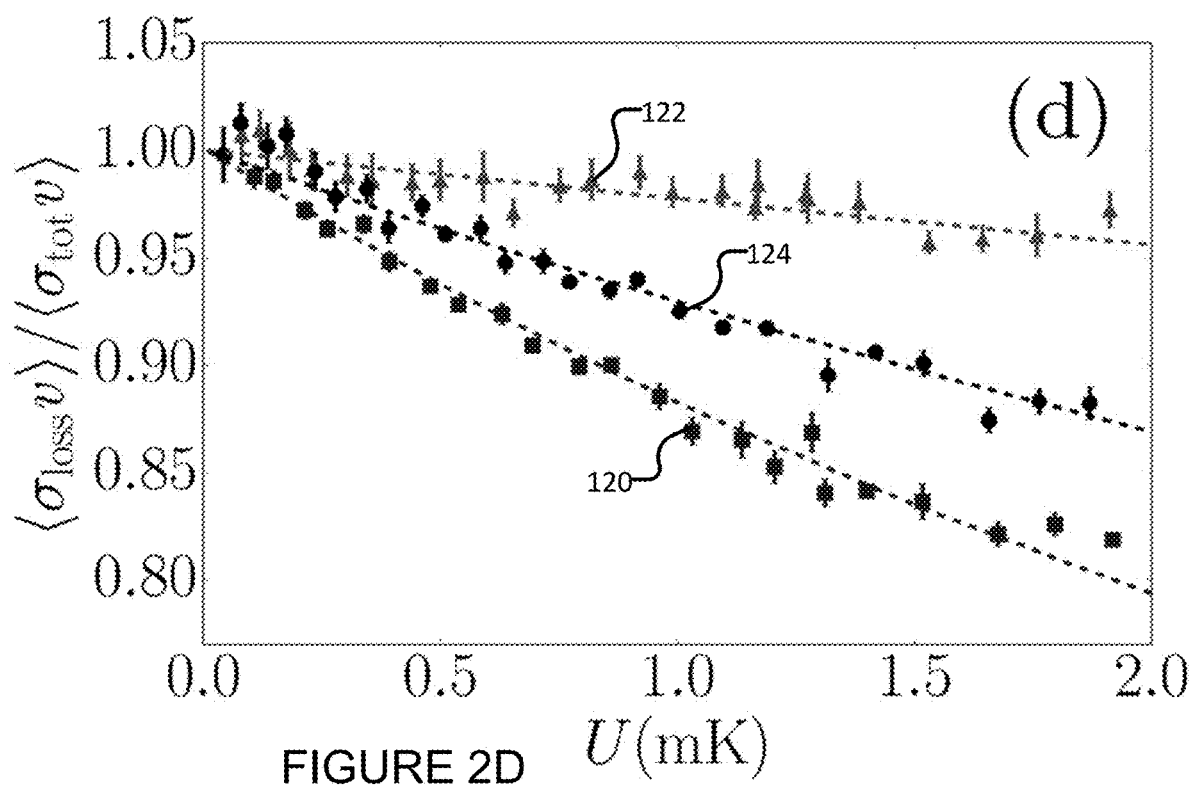

The FIG. 2C curves 116', 118' (or analogous curves for other species of residual particles) may be extrapolated to U=0 to yield their corresponding loss rates at zero trap depth (i.e. $\Gamma_{loss}(U=0)$). FIG. 2D shows a number of curves where the loss rates $\Gamma_{loss}$ are normalized by dividing them by their extrapolated zero-trap-depth loss rates $\Gamma_{loss}(U=0)$ for $^{87}$Rb sensor atoms with residual particles of Xe (square data point curve 120), He (triangle data point curve 122) and Ar (circle data point curve 124). That is, curves 120, 122, 124 represent plots of $\Gamma_{loss}(U)/\Gamma_{loss}(0)=\langle \sigma_{loss} v \rangle/\langle \sigma_{tot} v \rangle$ versus trap depth (U) $^{87}$Rb sensor atoms with residual particles of Xe, He and Ar respectively. Both the maximum normalized loss rate $\Gamma_{loss}(U)/\Gamma_{loss}(0)$ and the shapes of the normalized trap loss rate versus trap depth (U) curves are different for each species pair.

Figure 2E:
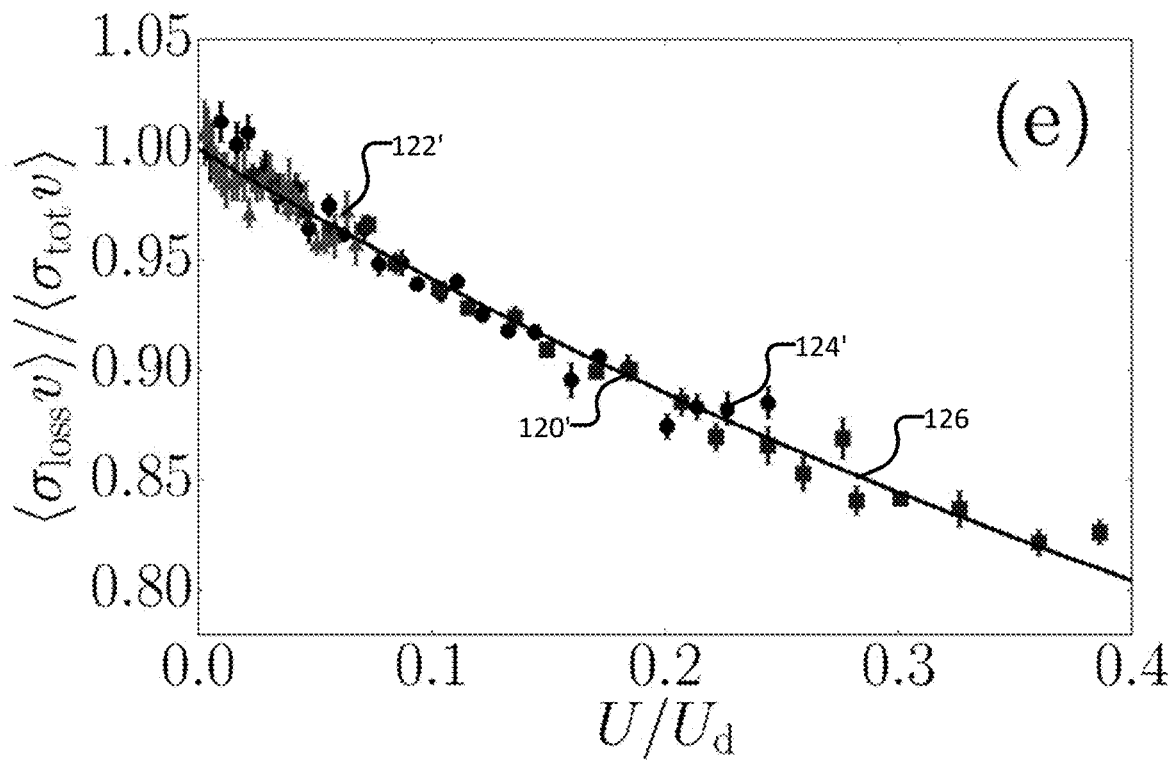
Figure 2F:
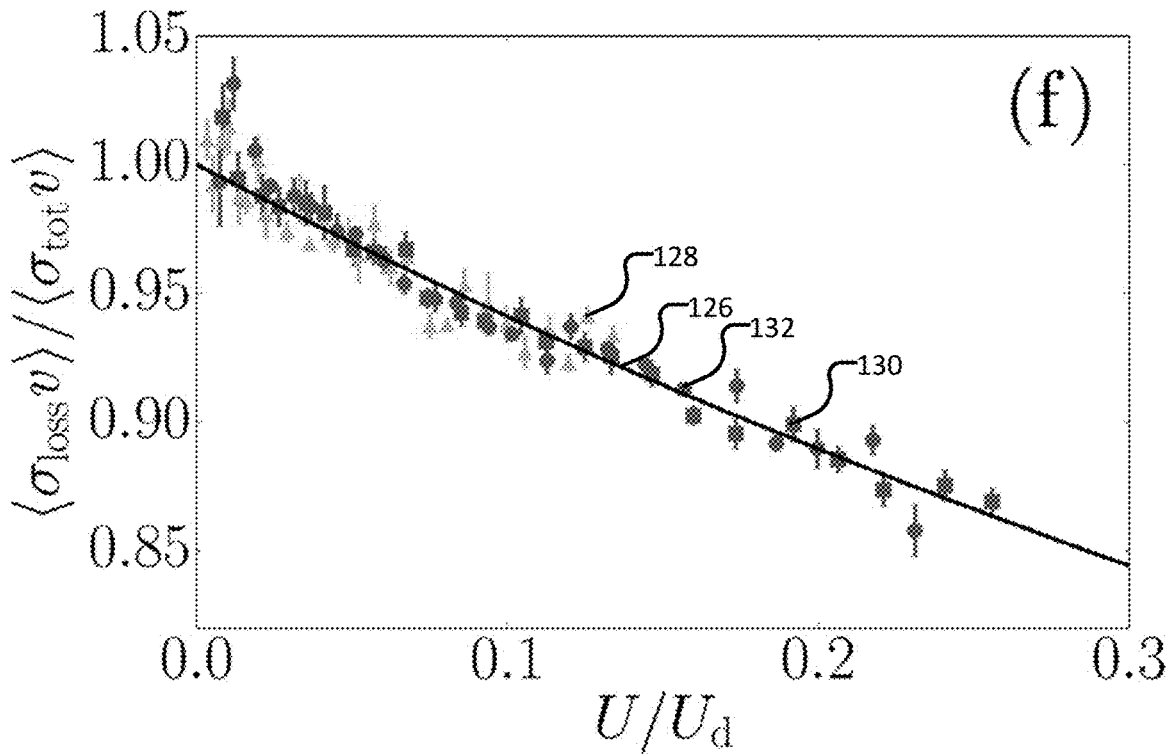

FIG. 2E shows sets of data points 120', 122', 124' which represent the FIG. 2D curves 120, 122, 124 with the abscissa scaled by $U_d$. FIG. 2E shows that $\langle \sigma_{loss} v \rangle/\langle \sigma_{tot} v \rangle$ for the different species pairs collapse to the single curve (shown by solid line) 126. This curve 126 is expected based on the right hand side of equation (6). FIG. 2F shows similar data points to those of FIG. 2E for molecular residual gasses $H_2$ (triangular data points 128), $N_2$ (square data points 130) and $CO_2$ (circular data points 132) and a similar curve (shown by solid line) 126 representing the right hand side of equation (6).

In each experimental scenario, the values for $U_d$ and $i_g$ were determined by fitting the curve of equation (9) to the measured data and the results are shown in Table 2. In this regard, the experiment conducted on $N_2$ was particularly significant because the ionization gauge was calibrated at NIST for $N_2$ using their orifice flow standard and found to have a gauge calibration factor of $i_g$=0.94 (±2%). This NIST value is in agreement with the cold atom standard result of $i_{g,exp}$=0.943 (±2%). It is noteworthy that the NIST $N_2$ measurements were carried out after carefully preconditioning or "dosing" the ionization gauge. The cold atom standard result determined by the experiments conducted by the inventors required no preconditioning. The calibration measurements (i.e. obtaining $i_g$) with $H_2$ and $CO_2$ were performed without preconditioning.

Figure 3:
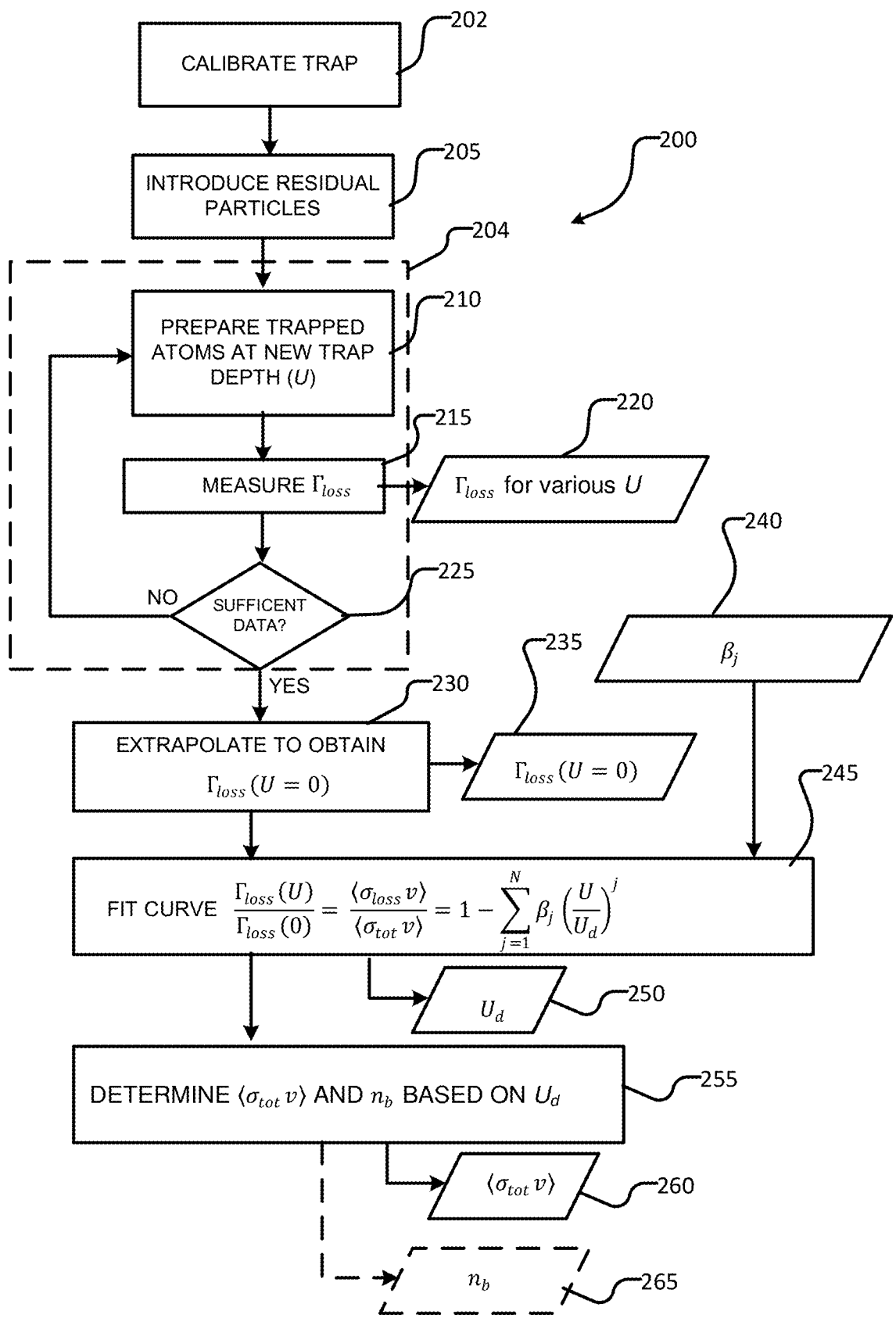
FIG. 3 is a schematic depiction of a method for determining the total velocity averaged cross-section $\langle \sigma_{tot} v \rangle$ for a particular species pair according to a particular embodiment.

Method for Determining Total Velocity Averaged Cross-Section $\langle \sigma_{tot} v \rangle$ FIG. 3 is a schematic depiction of a method 200 for determining the total velocity averaged cross-section $\langle \sigma_{tot} v \rangle$ for a particular species pair (trapped atoms and residual particles) according to a particular embodiment. Method 200 operates in the environment of a cold atom trap. Method 200 may be performed using any suitable cold atom trap known in the art and capable of providing the functionality described herein. Method 200 involves a number of steps similar to those described above in connection with FIGS. 2A-2F.

Method 200 begins in block 202 which involves calibrating the trap environment. This may be performed, by measuring the atom number $N_{MT}$ (and/or equivalently the photodetector fluorescence $V_{MT}$) of the cold trapped atoms when there are no residual particles in the vacuum environment over time (t) and taking a ratio of this atom number $N_{MT}$ and/or fluorescence $V_{MT}$ against the atom number or fluorescence at t=0 ($N_{MT}$(t=0) and/or $V_{MT}$(t=0)). This block 202 calibration procedure obtains data similar to that shown in curve 110 of FIG. 2A which relates to the background decay rate of the trapped sensor atoms, which may be due to a variety of loss mechanisms including, in part, collisions with residual background gasses present in the vacuum. This block 202 background decay rate may be used to modify (e.g. subtracted from) other measured decay rates described herein to obtain calibrated decay rates that can be ascribed to interaction between trapped particles and residual particles (as opposed to background loss mechanisms). For the sake of brevity, this disclosure refers to measuring loss rates $\Gamma_{loss}$ without explicitly describing how the block 202 background decay rate is used to calibrate the measurement in each instance.

Method 200 then proceeds to block 205 which involves introducing residual particles into the cold atom trap. Method 200 then enters a loop 204. Loop 204 involves measuring a number of loss rates $\Gamma_{loss}$ for trapped atoms at different trap depths. In each iteration, cold atom trap loop 204 begins at block 210 which involves preparing the trapped atoms a new trap depth. In each iteration, block 215 involves measuring the loss rate $\Gamma_{loss}(U)$ for trapped atoms at the trap depth (U) set in block 210. Once the loss rate $\Gamma_{loss}(U)$ data 220 is obtained in block 215, method 200 loops (via the block 225 YES branch) back to block 210 to perform another iteration of loop 204 until the block 225 inquiry determines that sufficient loss rate $\Gamma_{loss}(U)$ data 220 has been obtained. The loss rate $\Gamma_{loss}(U)$ data 220 obtained in each iteration of loop 204 is similar to the data shown in FIG. 2B. When sufficient loss rate $\Gamma_{loss}(U)$ data 220 has been obtained, then the block 225 inquiry is positive and method 200 proceeds to block 230 via the block 225 YES branch.

In block 230, the loss rate $\Gamma_{loss}(U)$ data 220 is used to extrapolate to obtain the total loss rate $\Gamma_{loss}(U=0)$ 235. Method 200 then proceeds to block 245, where the loss rate $\Gamma_{loss}(U)$ data 220, the total loss rate $\Gamma_{loss}(U=0)$ 235 and the coefficients $\beta_j$ 240 can be used in a curve fitting procedure according to:

$$\frac{\Gamma_{loss}(U)}{\Gamma_{loss}(U=0)} = \frac{\langle \sigma_{loss} v \rangle}{\langle \sigma_{tot} v \rangle} = 1 - \sum_{j=1}^{N} \beta_j \left(\frac{U}{U_d}\right)^j \quad (10)$$

This block 245 procedure involves fitting the right hand side of equation (10) to the measured data on the left hand side of equation (10) to obtain an estimate of the value $U_d$. As discussed above, the coefficients $\beta_j$ 240 can be obtained using one or more theoretical models. By way of non-limiting example the coefficients $\beta_j$ shown in Table 1 may be used as the coefficients $\beta_j$ 240 for the purpose of the block 245 curve fitting. The output of the block 245 curve fitting is the parameter $U_d$ 250.

Method 200 then proceeds to block 255 which involves determining the total velocity averaged cross-section $\langle \sigma_{tot} v \rangle$ 260 using the parameter $U_d$ 250 obtained in block 245. Specifically, block 255 may involve determining the total velocity averaged cross-section $\langle \sigma_{tot} v \rangle$ 260 using equation (8A):

$$\langle \sigma_{tot} v \rangle = \sqrt{2k_B T/m_{bg}} \frac{4\pi \hbar^2}{m_t U_d} \quad (8A)$$

It will be appreciated that $U_d$ is a function of $\langle \sigma_{tot} v \rangle$. Specifically, rearranging equation (8A) yields:

$$U_d = \sqrt{2k_B T/m_{bg}} \frac{4\pi \hbar^2}{m_t \langle \sigma_{tot} v \rangle} \quad (8B)$$

Consequently, in some embodiments (not expressly shown in FIG. 3), it is not necessary to solve for $U_d$. Instead, in such embodiments, equation (8B) can be substituted into equation (10) and the block 245 curve fitting process may be used to solve directly for $\langle \sigma_{tot} v \rangle$.

Once $\langle \sigma_{tot} v \rangle$ 260 is determined, equation (8)

$$n_b = \Gamma_{loss}(U)/[\langle \sigma_{tot} v \rangle \cdot (1 - p_{QM})] \quad (8)$$

may optionally be used in block 255 to determine the number of residual particles $n_b$ 265 in the vacuum environment, where $p_{QM}$ is given by equation (5):

$$p_{QM} \equiv \sum_{j=1}^{N} \beta_j \left(\frac{U}{U_d}\right)^j \quad (5)$$

Figure 4:
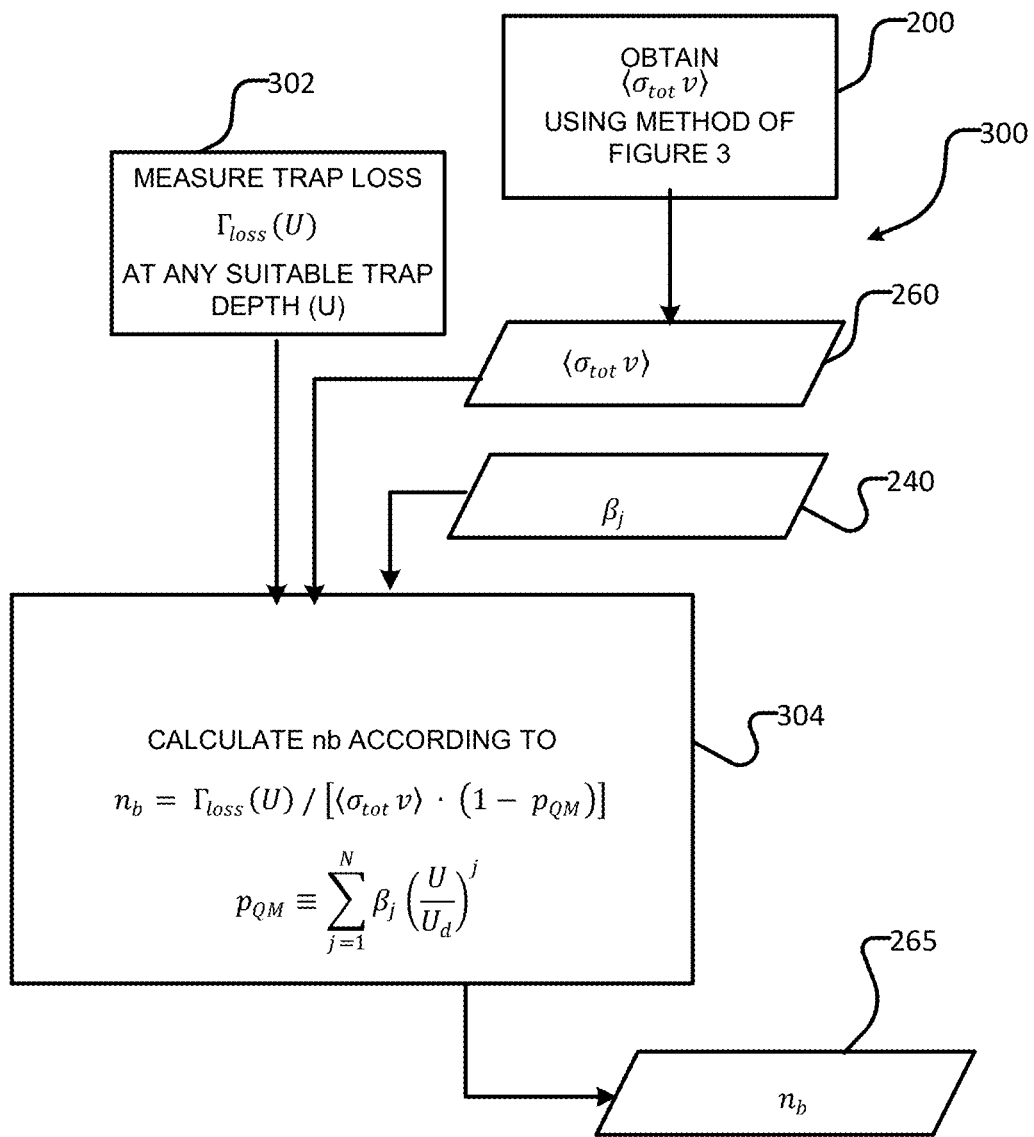
FIG. 4 schematically illustrates a method for determining, for a cold atom trap, the number density $\underline{n}_b$ (or equivalently, via the ideal gas law, the pressure $P_b$) of any residual particle in the vacuum environment if the total velocity averaged cross-section $\langle \sigma_{tot} v \rangle$ is known (by the method of FIG. 3) for the species pair of the trapped atom and the residual particle according to a particular embodiment.

Method for Determining $n_b$ if Total Velocity Averaged Cross-Section $\langle \sigma_{tot} v \rangle$ Known FIG. 4 schematically illustrates a method 300 for determining, for a cold atom trap, the number density $n_b$ (or equivalently, via the ideal gas law, the pressure $P_b$) of any residual particle in the vacuum environment according to a particular embodiment. Method 300 may be performed using any suitable cold atom trap known in the art and capable of providing the functionality described herein. Method 300 involves determining the total velocity averaged cross-section $\langle \sigma_{tot} v \rangle$ 260 according to method 200 of FIG. 3 or otherwise obtaining the total velocity averaged cross-section $\langle \sigma_{tot} v \rangle$ 260. It will be appreciated that once $\langle \sigma_{tot} v \rangle$ 260 is determined for a particular species (trapped atom and residual particle) pair according to method 200, it need not be determined again for each implementation of method 300—i.e. $\langle \sigma_{tot} v \rangle$ 260 need only be determined once according to method 200 (FIG. 3) and thereafter method 300 (FIG. 4) may be practiced using the known value of $\langle \sigma_{tot} v \rangle$ 260. Method 300 also makes use of the coefficients $\beta_j$ 240. As discussed above, the coefficients $\beta_j$ 240 can be obtained using one or more theoretical models. By way of non-limiting example the coefficients $\beta_j$ shown in Table 1 may be used as the coefficients $\beta_j$ 240 for the purpose of method 300.

In block 302, the trap loss rate $\Gamma_{loss}(U)$ is measured for the particular species pair at a convenient trap depth (U). Although not explicitly shown in FIG. 4, calibration (background) loss rates may be obtained in a manner similar to that discussed for block 202 above and the block 302 measurement may be calibrated in a manner similar to that discussed above. Further, performing the block 302 measurement may involve setting up the trap using steps similar to those of blocks 205, 210 of method 200 (FIG. 3), but these steps are not explicitly detailed in the FIG. 4 illustration. Once the trap loss rate $\Gamma_{loss}(U)$ is measured at a convenient trap depth (U), then method 300 proceeds to block 304 which involves calculating $n_b$ 265 according to equation (8):

$$n_b = \Gamma_{loss}(U)/[\langle\sigma_{tot}v\rangle \cdot (1 - p_{QM})] \quad (8)$$
where:

$$p_{QM} \equiv \sum_{j=1}^{N} \beta_j \left(\frac{U}{U_d}\right)^j \quad (5)$$

Advantageously, method 300 permits determination of the number density $n_b$ (or equivalently, via the ideal gas law, the pressure $p_b$) of any residual particle in the vacuum environment at any convenient trap depth (U) which can be useful for some traps that do not have easily adjustable trap depths.

Method for Calibrating Ionization Gauge

Figure 5:
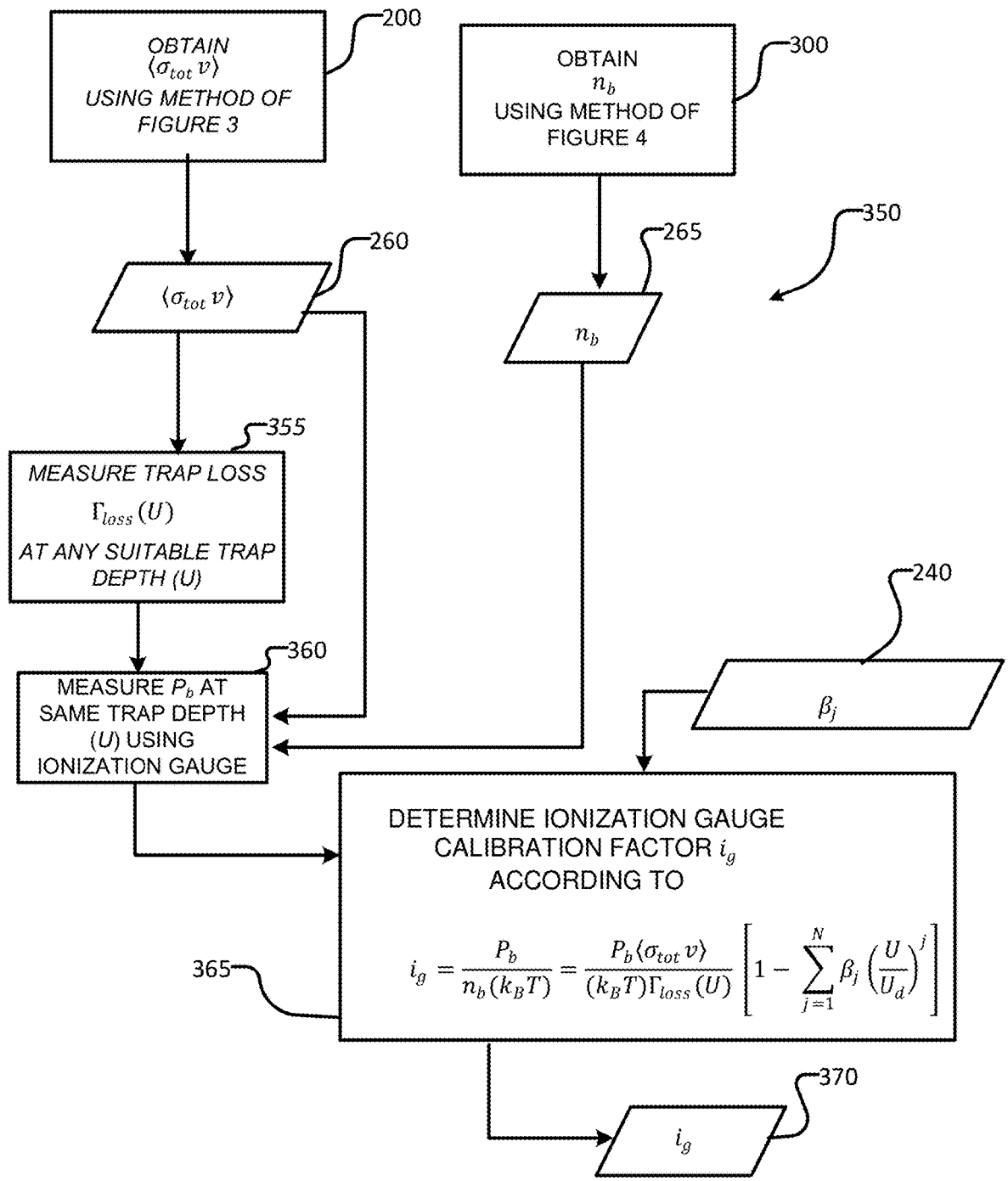
FIG. 5 schematically illustrates a method for calibrating, using a cold atom trap, an ionization gauge to determine the ionization gauge calibration parameter $i_g$ for any residual particle in the vacuum environment according to a particular embodiment.

FIG. 5 schematically illustrates a method 350 for calibrating, using a cold atom trap, an ionization gauge to determine the ionization gauge calibration parameter $i_g$ for any residual particle in the vacuum environment according to a particular embodiment. Method 350 may be performed using any suitable cold atom trap known in the art and capable of providing the functionality described herein. Method 350 involves determining the total velocity averaged cross-section $\langle\sigma_{tot}v\rangle$ 260 according to method 200 of FIG. 3 or otherwise obtaining the total velocity averaged cross-section $\langle\sigma_{tot}v\rangle$ 260. It will be appreciated that once $\langle\sigma_{tot}v\rangle$ 260 is determined for a particular species (trapped atom and residual particle) pair according to method 200, it need not be determined again for each implementation of method 350—i.e. $\langle\sigma_{tot}v\rangle$ 260 need only be determined once according to method 200 (FIG. 3) and thereafter method 350 (FIG. 5) may be practiced using the known value of $\langle\sigma_{tot}v\rangle$ 260. Method 350 also makes use of the coefficients $\beta_j$ 240. As discussed above, the coefficients $\beta_j$ 240 can be obtained using one or more theoretical models. By way of non-limiting example the coefficients $\beta_j$ shown in Table 1 may be used as the coefficients $\beta_j$ 240 for the purpose of method 350.

Method 350 may arrive at block 360 through one (or both) of two paths. One such path (through block 355) involves measuring the trap loss rate $\Gamma_{loss}(U)$ for the particular species pair at a convenient trap depth (U). Although not explicitly shown in FIG. 5, calibration (background) loss rates may be obtained in a manner similar to that discussed for block 202 above and the block 355 measurement may be calibrated in a manner similar to that discussed above. Further, performing the block 355 measurement may involve setting up the trap using steps similar to those of blocks 205, 210 of method 200 (FIG. 3), but these steps are not explicitly detailed in the FIG. 5 illustration. Additionally or alternatively, method 300 (FIG. 4) may be performed to obtain the number density $n_b$ 265 (or equivalently, via the ideal gas law, the pressure $P_b$) of any residual particle in the vacuum environment.

Either way, method 350 arrives at block 360, where the pressure of the residual particle $P_b$ is measured using the ionization gauge at the same trap depth (U) used to obtain the trap loss rate $\Gamma_{loss}(U)$ (in block 355) or the number density $n_b$ 265 (via method 300). Once the pressure of the residual particle $P_b$ is measured using the ionization gauge in block 360, method 350 proceeds to block 365 which involves calculating the ionization gauge calibration factor $i_g$ according to a rearrangement of equation (9):

$$i_g = \frac{P_b}{n_b(k_BT)} = \frac{P_b\langle\sigma_{tot}v\rangle}{(k_BT)\Gamma_{loss}(U)}\left[1 - \sum_{j=1}^{N} \beta_j\left(\frac{U}{U_d}\right)^j\right] \quad (11)$$

where the middle expression may be used if the number density $n_b$ 265 is known (via method 300) or the right hand expression may be used if $r_{loss}(U)$ is known via block 355.

In addition to or in the alternative to calibrating an ionization gauge, method 350 may be used to determine a calibration factor $i_s$ for a mass spectrometer, where block 360 procedure of the FIG. 5 embodiment is replaced by measuring a signal $S_b$ for the mass spectrometer at the same trap depth (U) used to obtain the trap loss rate $\Gamma_{loss}(U)$ (in block 355) or the number density $n_b$ 265 (via method 300) and, in the equation of block 365, $i_s$ replaces $i_g$ and $S_b$ replaces $P_b$:

$$i_s = \frac{S_b}{n_b(k_BT)} = \frac{S_b\langle\sigma_{tot}v\rangle}{(k_BT)\Gamma_{loss}(U)}\left[1 - \sum_{j=1}^{N} \beta_j\left(\frac{U}{U_d}\right)^j\right] \quad (12)$$

Method for Determining the Pressures of Multiple Species

Figure 6:
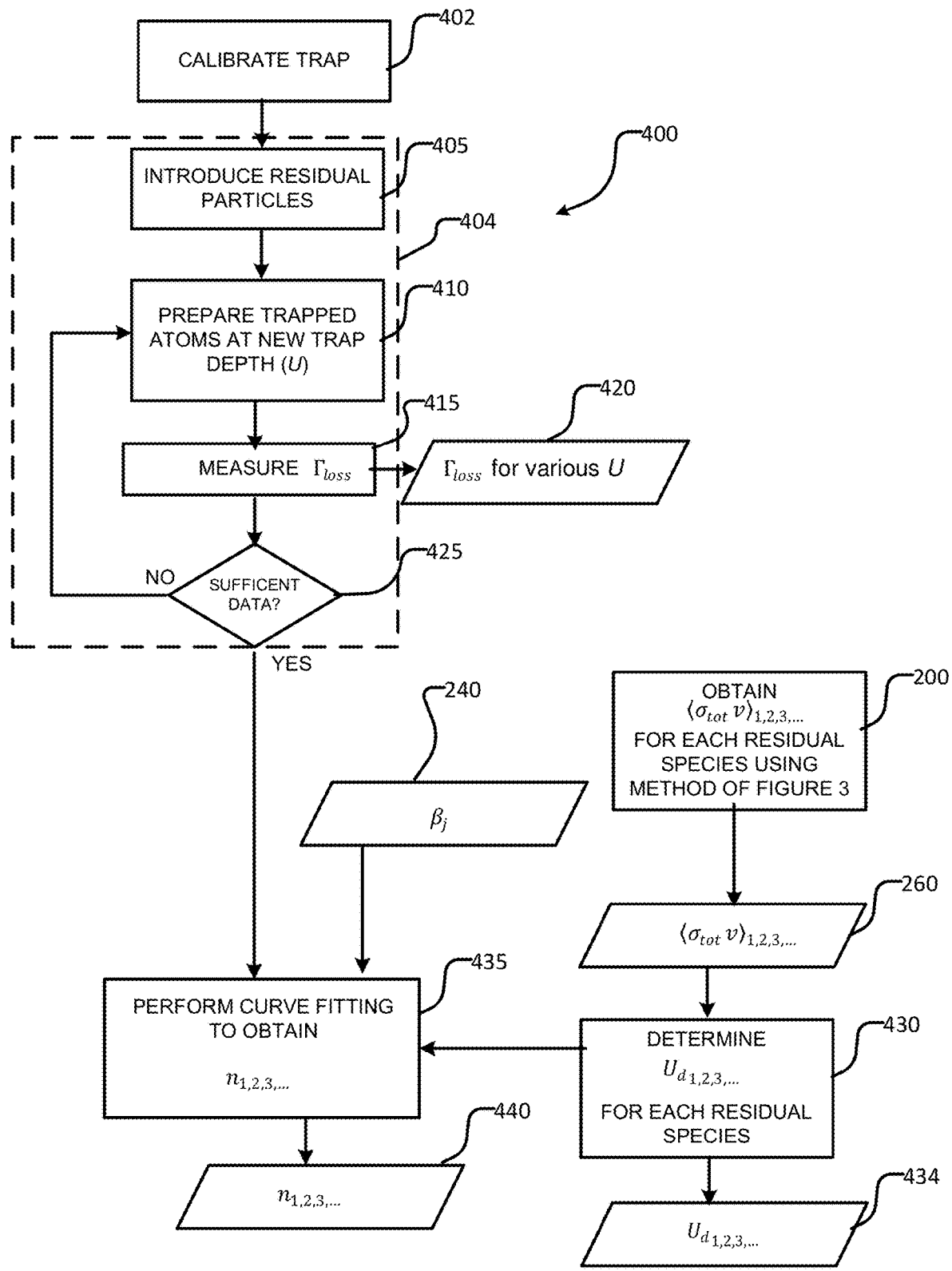
FIG. 6 schematically illustrates a method for determining, using a cold atom trap, the number density $n_{1,2,3,\ldots}$ (or equivalently, via the ideal gas law, the pressures $P_{1,2,3,\ldots}$) of a plurality of residual particles in a vacuum environment for each species pair of trapped atom and the residual particle according to a particular embodiment.

FIG. 6 schematically illustrates a method 400 for determining, using a cold atom trap, the number density $n_{1,2,3,\ldots}$ (or equivalently, via the ideal gas law, the pressures $P_{1,2,3,\ldots}$) of a plurality of residual particles in the vacuum environment according to a particular embodiment. Method 400 may be performed using any suitable cold atom trap known in the art and capable of providing the functionality described herein. Method 400 involves determining the total velocity averaged cross-section $\langle\sigma_{tot}v\rangle_{1,2,3,\ldots}$ 260 for each species pair comprising the trapped atoms and one of the plurality of residual particles according to method 200 of FIG. 3 or otherwise obtaining the total velocity averaged cross-section $\langle\sigma_{tot}v\rangle_{1,2,3,\ldots}$ 260 for each such species pair (which may be determined using method 200 of FIG. 3). It will be appreciated that once $\langle\sigma_{tot}v\rangle$ 260 is determined for a particular species (trapped atom and residual particle) pair according to method 200, it need not be determined again for each implementation of method 400—i.e. $\langle\sigma_{tot}v\rangle_{1,2,3,\ldots}$ 260 need only be determined once according to method 200 (FIG. 3) and thereafter method 400 (FIG. 6) may be practiced using the known values of $\langle\sigma_{tot}v\rangle_{1,2,3,\ldots}$ 260. Method 400 also makes use of the coefficients $\beta_j$ 240. As discussed above, the coefficients $\beta_j$ 240 can be obtained using one or more theoretical models. By way of non-limiting example the coefficients $\beta_j$ shown in Table 1 may be used as the coefficients $\beta_j$ 240 for the purpose of method 400.

Method 400 shares a number of steps that are similar, identical or analogous to the steps of method 200 described above. Elements of method 400 that correspond to elements of method 200 are illustrated with like reference numerals that have been incremented by 200. Blocks 402, 405, 410, 415, 425 and loop 404 are substantially the same as blocks 202, 205, 210, 215, 225 and loop 204 except that: (i) block 405 involves the introduction of a plurality of residual particles (rather than a single residual particles, as was the case with block 205); and (ii) the block 425 inquiry as to whether there is sufficient data comprises a minimum condition that the number of iterations of loop 404 is at least as many as the number of residual particles in the system under examination.

Leaving block 425 via the YES branch means that there have been a number of trap loss rate $\Gamma_{loss_{1,2,3,\ldots}}(U_{1,2,3,\ldots})$ for various trap depths ($U_{1,2,3,...}$). These measurements are shown in FIG. 6 as $\Gamma_{loss}$ for various U 420. Before performing the procedures of block 435, method 400 also comprises, in block 430, determining the various $U_{d_{1,2,3,...}}$ for the species of residual particles in the system under consideration. This block 430 procedure involves using the total velocity averaged cross-sections $\langle \sigma_{tot} \rangle_{1,2,3,...}$ 260 for the various species of residual particles in the system under consideration. For each species of residual particle, the corresponding value of $U_d$ may be determined according to a combination of equations (2)-(4):

$$U_d = \sqrt{2k_B T/m_{bg}} \frac{4\pi \hbar}{m_t \langle \sigma_{tot} v \rangle}^2 \quad (13)$$

The various $U_{d_{1,2,3,...}}$ for the species of residual particles in the system under consideration are shown in FIG. 6 as $U_{d_{1,2,3,...}}$ 434.

Then, method 400 proceeds to block 435 which involves solving a system of equations to obtain the number densities $n_{1,2,3,...}$ (and equivalently, by the ideal gas law the pressures $P_{1,2,3,...}$) for the various residual particle species in the system under consideration. The block 435 system of equations may have the form:

$$\Gamma_{loss}(U_1) = n_1 \langle \sigma_{tot} v \rangle_1 \left[ 1 - \sum_{j=1}^{N} \beta_j \left( \frac{U_1}{U_{d1}} \right)^j \right] + \quad (13A)$$
$$n_2 \langle \sigma_{tot} v \rangle_2 \left[ 1 - \sum_{j=1}^{N} \beta_j \left( \frac{U_1}{U_{d2}} \right)^j \right] +$$
$$n_3 \langle \sigma_{tot} v \rangle_3 \left[ 1 - \sum_{j=1}^{N} \beta_j \left( \frac{U_1}{U_{d3}} \right)^j \right] + ...$$

$$\Gamma_{loss}(U_2) = n_1 \langle \sigma_{tot} v \rangle_1 \left[ 1 - \sum_{j=1}^{N} \beta_j \left( \frac{U_2}{U_{d1}} \right)^j \right] + \quad (13B)$$
$$n_2 \langle \sigma_{tot} v \rangle_2 \left[ 1 - \sum_{j=1}^{N} \beta_j \left( \frac{U_2}{U_{d2}} \right)^j \right] +$$
$$n_3 \langle \sigma_{tot} v \rangle_3 \left[ 1 - \sum_{j=1}^{N} \beta_j \left( \frac{U_2}{U_{d3}} \right)^j \right] + ...$$

$$\Gamma_{loss}(U_3) = n_1 \langle \sigma_{tot} v \rangle_1 \left[ 1 - \sum_{j=1}^{N} \beta_j \left( \frac{U_3}{U_{d1}} \right)^j \right] + \quad (13C)$$
$$n_2 \langle \sigma_{tot} v \rangle_2 \left[ 1 - \sum_{j=1}^{N} \beta_j \left( \frac{U_3}{U_{d2}} \right)^j \right] +$$
$$n_3 \langle \sigma_{tot} v \rangle_3 \left[ 1 - \sum_{j=1}^{N} \beta_j \left( \frac{U_3}{U_{d3}} \right)^j \right] + ...$$

$$\vdots \quad \vdots \quad \vdots$$

It will be appreciated from consideration of equations (13A), (13B), (13C), . . . that all of the quantities in these equations are know except for the number densities $n_{1,2,3,...}$ for the various residual particle species in the system under consideration. These number densities $n_{1,2,3,...}$ (and equivalently, by the ideal gas law the pressures $P_{1,2,3,...}$) for the various residual particle species in the system under consideration represent the output 440 of method 400.

In some embodiments, method 400 may be combined with the use of a mass spectrometer, so that the mass spectrometer can be used to determine the identity of the residual particles in a system under consideration and then method 400 can be used to determine the number densities $n_{1,2,3,...}$ (and equivalently, by the ideal gas las the pressures $P_{1,2,3,...}$) for the various residual particle species.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method for determining a total velocity average cross-section parameter $\langle \sigma_{tot} v \rangle$ in a relationship of the form $\Gamma_{loss}(U) = n_b \langle \sigma_{tot} v \rangle \cdot f(U, U_d)$, where: $\Gamma_{loss}(U)$ is a rate of exponential loss of sensor atoms from a cold atom sensor trap of trap depth potential energy U in a vacuum environment due to collisions with residual particles in the vacuum environment; $n_b$ is a number density of residual particles in the vacuum environment; $U_d$ is a parameter given by $$U_d = \sqrt{2 k_B T / m_{bg}} \, \frac{4 \pi \hbar^2}{m_t \langle \sigma_{tot} v \rangle}$$

which relates masses of the sensor atoms $m_t$ and residual particles $m_{bg}$ to the total velocity average cross-section parameter $\langle \sigma_{tot} v \rangle$; and $f(U, U_d)$ is a function of the trap depth potential energy U and the parameter $U_d$ which models a naturally occurring dependence of the loss rate $\Gamma_{loss}(U)$ on the trap depth potential energy U and the parameter $U_d$, where $f(U=0, U_d)$ is unity for all $U_d$, the method comprising:

for a particular species pair comprising the sensor atoms and the residual particles, iterating a process which comprises in each iteration: varying the trap depth potential energy U for the cold atom sensor trap in which the sensor atoms are trapped; and measuring the loss rate $\Gamma_{loss}(U)$ of the sensor atoms from the cold atom sensor trap;

after a plurality of iterations of the process, extrapolating the measured loss rate $\Gamma_{loss}(U)$ data to obtain an estimate of $\Gamma_{loss}(U=0)$;

determining the total velocity average cross-section parameter $\langle \sigma_{tot}v \rangle$ wherein determining the total velocity average cross-section parameter $\langle \sigma_{tot}v \rangle$ comprises performing a curve fitting process to fit $$\frac{\Gamma_{loss}(U)}{\Gamma_{loss}(U=0)} = \frac{\langle \sigma_{loss}v \rangle}{\langle \sigma_{tot}v \rangle} = f(U, U_d),$$

where $\langle \sigma_{loss}v \rangle$ is velocity averaged cross-section of the particular species pair at a given trap depth potential energy U, to solve for the total velocity average cross-section parameter $\langle \sigma_{tot}v \rangle$.

2. A method according to claim 1 wherein performing the curve fitting process to fit $$\frac{\Gamma_{loss}(U)}{\Gamma_{loss}(U=0)} = \frac{\langle \sigma_{loss}v \rangle}{\langle \sigma_{tot}v \rangle} = f(U, U_d)$$

to solve for the total velocity average cross-section parameter $\langle \sigma_{tot}v \rangle$ comprises:

expressing $f(U, U_d)$ as $f(U, \langle \sigma_{tot}v \rangle)$ based on $$U_d = \sqrt{2k_BT/m_{bg}} \frac{4\pi\hbar^2}{m_t \langle \sigma_{tot}v \rangle};$$

and performing the curve fitting process to solve directly for the total velocity average cross-section parameter $\langle \sigma_{tot}v \rangle$.

3. A method according to claim 1 wherein performing the curve fitting process to fit $$\frac{\Gamma_{loss}(U)}{\Gamma_{loss}(U=0)} = \frac{\langle \sigma_{loss}v \rangle}{\langle \sigma_{tot}v \rangle} = f(U, U_d)$$

to solve for the total velocity average cross-section parameter $\langle \sigma_{tot}v \rangle$ comprises:

performing the curve fitting process to fit $$\frac{\Gamma_{loss}(U)}{\Gamma_{loss}(U=0)} = \frac{\langle \sigma_{loss}v \rangle}{\langle \sigma_{tot}v \rangle} = f(U, U_d)$$

to thereby determine the parameter $U_d$; and determining the total velocity average cross-section parameter $\langle \sigma_{tot}v \rangle$ according to $$\langle \sigma_{tot}v \rangle = \sqrt{2k_BT/m_{bg}} \frac{4\pi\hbar^2}{m_t U_d}.$$

4. A method according to claim 1 wherein the model function $f(U, U_d)$ has a form of a polynomial expansion in a variable $$\left(\frac{U}{U_d}\right).$$

5. A method according to claim 1 wherein the model function $f(U, U_d)$ has a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

6. A method according to claim 5, wherein $p_{QM}$ represents a probability that a sensor atom stays in the cold atom sensor trap after a collision with a residual particle.

7. A method according to claim 5, wherein the parameters $\beta_j$ of the model function $f(U, U_d)$ are determined based on a theoretical model of collisions between the sensor atoms and the residual particles.

8. A method according to claim 5 wherein the parameters $\beta_j$ of the model function $f(U, U_d)$ are experimentally determined.

9. A method for determining a number density $n_b$ of second residual particles in a second vacuum environment comprising second sensor atoms trapped in a second cold atom sensor trap of trap depth potential energy U*, the method comprising:

using the total velocity average cross-section parameter $\langle \sigma_{tot}v \rangle$ determined in accordance with the method of claim 1 wherein the second sensor atoms are the same as the sensor atoms and the second residual particles are the same as the residual particles;

measuring a loss rate $\Gamma_{loss}(U=U^*)$ of the second sensor atoms from the second cold atom sensor trap at the trap depth potential energy U*; and determining the number density $n_b$ of second residual particles in the second vacuum environment according to $n_b = \Gamma_{loss}(U^*)/[\langle \sigma_{tot}v \rangle \cdot f(U=U^*, U_d)]$.

10. A method according to claim 9 wherein the second vacuum environment is the same as the vacuum environment and the second cold atom trap is the same as the cold atom trap.

11. A method according to claim 9 wherein the second vacuum environment is different from the vacuum environment and the second cold atom trap is different from the cold atom trap.

12. A method according to claim 9 wherein the model function $f(U, U_d)$ has a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

13. A method for calibrating an ionization gauge which measures a pressure $P_b$ of second residual particles in a second vacuum environment comprising second sensor atoms trapped in a second cold atom sensor trap of trap depth potential energy U*, the method comprising:

using the total velocity average cross-section parameter $\langle \sigma_{tot} v \rangle$ determined in accordance with the method of claim 1 wherein the second sensor atoms are the same as the sensor atoms and the second residual particles are the same as the residual particles;

measuring a loss rate $\Gamma_{loss}(U=U^*)$ of the second sensor atoms from the second cold atom sensor trap at the trap depth potential energy $U^*$;

measuring the pressure $P_b$ of the second residual particles in the second vacuum environment using the ionization gauge at the same trap depth potential energy $U^*$; and determining a calibration factor $i_g$ for the ionization gauge according to:

$$i_g = \frac{P_b \langle \sigma_{tot} v \rangle}{(k_B T) \Gamma_{loss}(U)} f(U=U^*, U_d).$$

14. A method according to claim 13 wherein the second vacuum environment is the same as the vacuum environment and the second cold atom trap is the same as the cold atom trap.

15. A method according to claim 13 wherein the second vacuum environment is different from the vacuum environment and the second cold atom trap is different from the cold atom trap.

16. A method according to claim 13 wherein the model function $f(U, U_d)$ has a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

17. A method for calibrating an ionization gauge which measures a pressure $P_b$ of second residual particles in a second vacuum environment comprising second sensor atoms trapped in a second cold atom sensor trap of trap depth potential energy $U^*$, the method comprising:

using the number density $n_b$ of second residual particles in the second vacuum environment determined in accordance with the method of claim 9 wherein the second sensor atoms are the same as the sensor atoms and the second residual particles are the same as the residual particles;

measuring a loss rate $\Gamma_{loss}(U=U^*)$ of the second sensor atoms from the second cold atom sensor trap at the trap depth potential energy $U^*$;

measuring the pressure $P_b$ of the second residual particles in the second vacuum environment using the ionization gauge at the same trap depth potential energy $U^*$; and determining a calibration factor $i_g$ for the ionization gauge according to:

$$i_g = \frac{P_b}{n_b (k_B T)}.$$

18. A method according to claim 17 wherein the second vacuum environment is the same as the vacuum environment and the second cold atom trap is the same as the cold atom trap.

19. A method according to claim 17 wherein the second vacuum environment is different from the vacuum environment and the second cold atom trap is different from the cold atom trap.

20. A method according to claim 17 wherein the model function $f(U, U_d)$ has a form of $(1-p_{QM})$, where $$p_{QM} = \sum_{j=1}^{J} \beta_j \left(\frac{U}{U_d}\right)^j$$

where J is an integer greater than 1 and $\beta_j$ are parameters of the model function $f(U, U_d)$.

21. A method for calibrating a mass spectrometer which measures a signal $S_b$ corresponding to second residual particles in a second vacuum environment comprising second sensor atoms trapped in a second cold atom sensor trap of trap depth potential energy $U^*$, the method comprising:

using the total velocity average cross-section parameter $\langle \sigma_{tot} v \rangle$ determined in accordance with the method of claim 1 wherein the second sensor atoms are the same as the sensor atoms and the second residual particles are the same as the residual particles;

measuring a loss rate $\Gamma_{loss}(U=U^*)$ of the second sensor atoms from the second cold atom sensor trap at the trap depth potential energy $U^*$;

measuring a signal $S_b$ corresponding to the second residual particles in the second vacuum environment using the mass spectrometer at the same trap depth potential energy $U^*$; and determining a calibration factor $i_s$ for the mass spectrometer according to:

$$i_s = \frac{S_b \langle \sigma_{tot} v \rangle}{(k_B T) \Gamma_{loss}(U)} f(U=U^*, U_d).$$

22. A method for calibrating a mass spectrometer which measures a signal $S_b$ of second residual particles in a second vacuum environment comprising second sensor atoms trapped in a second cold atom sensor trap of trap depth potential energy $U^*$, the method comprising:

using the number density $n_b$ of second residual particles in the second vacuum environment determined in accordance with the method of claim 9 wherein the second sensor atoms are the same as the sensor atoms and the second residual particles are the same as the residual particles;

measuring a loss rate $\Gamma_{loss}(U=U^*)$ of the second sensor atoms from the second cold atom sensor trap at the trap depth potential energy $U^*$;

measuring a signal $S_b$ corresponding to the second residual particles in the second vacuum environment using the mass spectrometer at the same trap depth potential energy $U^*$; and determining a calibration factor $i_s$ for the mass spectrometer according to:

$$i_s = \frac{S_b}{n_b (k_B T)}.$$

23. A method for determining number densities $n_{1,2,3,\ldots}$ of a plurality of second residual particles in a second vacuum environment comprising second sensor atoms trapped in a second cold atom sensor trap, the method comprising:

for each of the plurality of second residual particles, using the total velocity average cross-section parameter $\langle \sigma_{tot} v \rangle$ determined in accordance with the method of claim 1 wherein the second sensor atoms are the same as the sensor atoms and the second residual particles are the same as the residual particles, to thereby obtain a plurality of total velocity average cross-section parameters $\langle \sigma_{tot} v \rangle_{1,2,3,\ldots}$ corresponding to the plurality of second residual particles;

iterating a process which comprises in each iteration:

varying the trap depth potential energy U for the cold atom sensor trap in which the sensor atoms are trapped; and measuring the loss rate $\Gamma_{loss}(U)$ of the sensor atoms from the cold atom sensor trap;

to thereby obtain a plurality of loss rates $\Gamma_{loss_{1,2,3,\ldots}}(U_{1,2,3,\ldots})$ at different trap depth potential energies $U_{1,2,3,\ldots}$, the plurality of loss rates $\Gamma_{loss_{1,2,3,\ldots}}(U_{1,2,3,\ldots})$ greater than or equal to the plurality of second residual particles;

determining corresponding values of $U_{d_{1,2,3,\ldots}}$ for the second residual particles according to $$U_{d_{1,2,3,\ldots}} = \sqrt{2k_B T/m_{bg}} \frac{4\pi\hbar^2}{m_t \langle \sigma_{tot} v \rangle_{1,2,3,\ldots}};$$

solving a system of equations having the form:

$$\Gamma_{loss}(U_1) = n_1 \langle \sigma_{tot} v \rangle_1 \left[1 - \sum_{j=1}^{N} \beta_j \left(\frac{U_1}{U_{d1}}\right)^j\right] + \quad (13A)$$
$$n_2 \langle \sigma_{tot} v \rangle_2 \left[1 - \sum_{j=1}^{N} \beta_j \left(\frac{U_1}{U_{d2}}\right)^j\right] +$$
$$n_3 \langle \sigma_{tot} v \rangle_3 \left[1 - \sum_{j=1}^{N} \beta_j \left(\frac{U_1}{U_{d3}}\right)^j\right] + \ldots$$

$$\Gamma_{loss}(U_2) = n_1 \langle \sigma_{tot} v \rangle_1 \left[1 - \sum_{j=1}^{N} \beta_j \left(\frac{U_2}{U_{d1}}\right)^j\right] + \quad (13B)$$
$$n_2 \langle \sigma_{tot} v \rangle_2 \left[1 - \sum_{j=1}^{N} \beta_j \left(\frac{U_2}{U_{d2}}\right)^j\right] +$$
$$n_3 \langle \sigma_{tot} v \rangle_3 \left[1 - \sum_{j=1}^{N} \beta_j \left(\frac{U_2}{U_{d3}}\right)^j\right] + \ldots$$

$$\Gamma_{loss}(U_3) = n_1 \langle \sigma_{tot} v \rangle_1 \left[1 - \sum_{j=1}^{N} \beta_j \left(\frac{U_3}{U_{d1}}\right)^j\right] + \quad (13C)$$
$$n_2 \langle \sigma_{tot} v \rangle_2 \left[1 - \sum_{j=1}^{N} \beta_j \left(\frac{U_3}{U_{d2}}\right)^j\right] +$$
$$n_3 \langle \sigma_{tot} v \rangle_3 \left[1 - \sum_{j=1}^{N} \beta_j \left(\frac{U_3}{U_{d3}}\right)^j\right] + \ldots$$

$$\vdots \quad \vdots \quad \vdots$$

to thereby obtain the number densities $n_{1,2,3,\ldots}$ of the plurality of second residual particles in the second vacuum environment.

\* \* \* \* \*